United States Patent
Park et al.

(10) Patent No.: US 10,104,585 B2
(45) Date of Patent: *Oct. 16, 2018

(54) METHOD FOR DETERMINING RADIO RESOURCE CONTROL CONFIGURATION IN A WIRELESS COMMUNICATION SYSTEM SUPPORTING DUAL CONNECTIVITY AND APPARATUS THEREOF

(71) Applicant: LG ELECTRONICS INC., Seoul (KR)

(72) Inventors: Kyungmin Park, Seoul (KR); Jian Xu, Seoul (KR); Daewook Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,723

(22) Filed: Jul. 11, 2017

(65) Prior Publication Data

US 2017/0318505 A1    Nov. 2, 2017

Related U.S. Application Data

(63) Continuation of application No. 15/023,968, filed as application No. PCT/KR2014/009236 on Sep. 30, 2014, now Pat. No. 9,756,531.

(Continued)

(51) Int. Cl.
*H04W 36/00* (2009.01)
*H04W 76/15* (2018.01)
(Continued)

(52) U.S. Cl.
CPC ....... *H04W 36/0055* (2013.01); *H04W 36/00* (2013.01); *H04W 72/048* (2013.01); *H04W 76/15* (2018.02); *H04W 92/20* (2013.01)

(58) Field of Classification Search
CPC . H04W 36/0055; H04W 36/00; H04W 76/15; H04W 92/20; H04W 72/048
See application file for complete search history.

(56) References Cited

U.S. PATENT DOCUMENTS

| 9,713,044 B2 * | 7/2017 | Yamada ............ H04W 36/0072 |
| 2011/0183675 A1 | 7/2011 | Bae et al. |

(Continued)

FOREIGN PATENT DOCUMENTS

| KR | 10-2009-0112337 A | 10/2009 |
| KR | 10-2012-0045554 A | 5/2012 |

OTHER PUBLICATIONS

3GPP TR 36.842 V0.2.0, "3GPP: TSGRAN; E-UTRA; Study on Small Cell Enhancements for E-UTRA and E-UTRAN—Higher layer aspects (Release 12)", Jun. 7, 2013 (http://www.3gpp.org/ftp/Specs/archive/36_Series/36.842/36842-020.zip), see pp. 16, 19, 27-28; and figure 8.1.2.1-1.

(Continued)

*Primary Examiner* — Khai M Nguyen
(74) *Attorney, Agent, or Firm* — Dentons US LLP

(57) ABSTRACT

A method for determining a radio resource control (RRC) configuration in a wireless communication system supporting dual connectivity, and an apparatus supporting the same is disclosed. The method for determining, by a base station (BS), a radio resource control (RRC) configuration in a wireless communication system supporting dual connectivity, includes transmitting, by a first BS, a first RRC configuration of a serving cell of the first BS or remained user equipment (UE) capability to a second BS configured in a UE, and receiving, by the first BS, a second RRC configuration of a serving cell of the second BS configured in the UE from the second BS. The first BS and the second BS are involved in dual connectivity for the UE, and the second (Continued)

RRC configuration is determined by the second BS based on the first RRC configuration or the remained UE capability.

8 Claims, 14 Drawing Sheets

Related U.S. Application Data

(60) Provisional application No. 61/910,008, filed on Nov. 27, 2013, provisional application No. 61/884,951, filed on Sep. 30, 2013.

(51) Int. Cl.
*H04W 72/04* (2009.01)
*H04W 92/20* (2009.01)

(56) References Cited

U.S. PATENT DOCUMENTS

| | | | |
|---|---|---|---|
| 2013/0329694 A1 | 12/2013 | Vrzic | H04W 36/165 370/331 |
| 2013/0331105 A1 | 12/2013 | Olofsson | H04W 36/0005 455/438 |
| 2014/0254373 A1 | 9/2014 | Varma | H04W 40/36 370/235 |
| 2014/0301360 A1* | 10/2014 | Bontu | H04W 36/0083 370/331 |
| 2015/0092552 A1 | 4/2015 | Bajj | H04W 28/08 370/235 |
| 2016/0338134 A1* | 11/2016 | Nagasaka | H04W 76/10 |
| 2018/0020500 A1* | 1/2018 | Pelletier | H04W 76/046 |
| 2018/0063861 A1* | 3/2018 | Zhang | H04W 72/1278 |

OTHER PUBLICATIONS

Interdigital Communucations, "Dual Connectivity for Small Cell Deployments", R2-131328, 3GPP TSG-RAN WG2 #81, Chicago, USA, Apr. 15-19, 2013 (http://www.3gpp.org/ftp/tsg_ran/WG2_RL2/TSGR2_81bis/Docs/R2-131328.zip), see Section 3.

* cited by examiner

[FIG. 1]
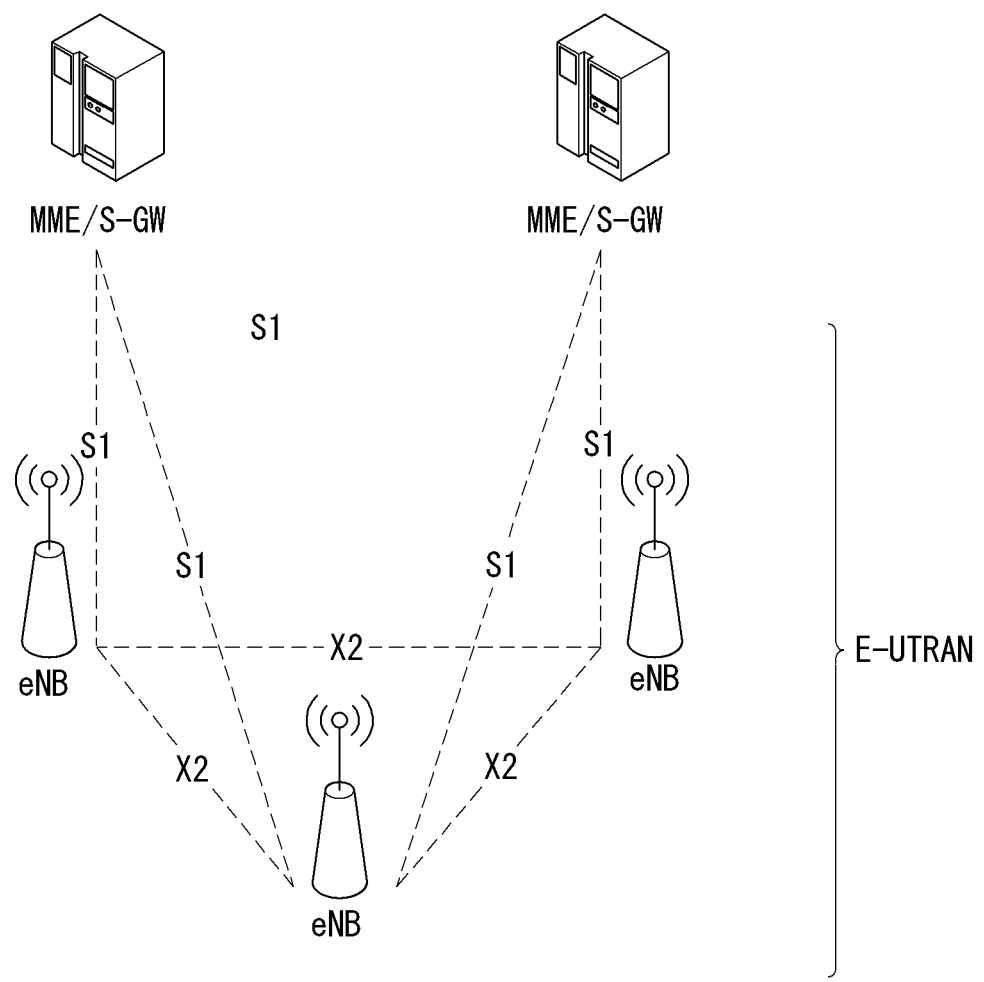

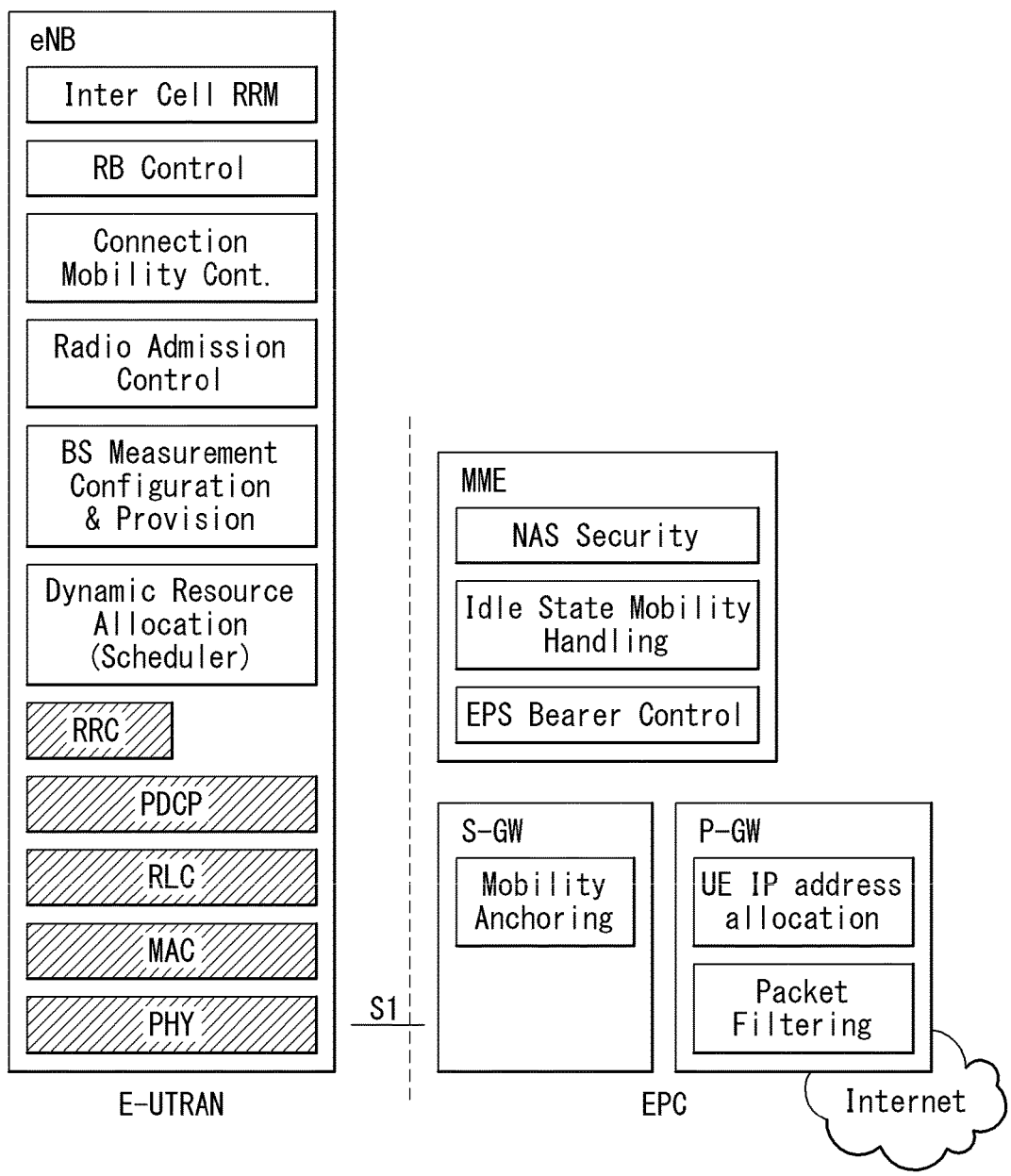
[FIG. 2]

[FIG. 3]
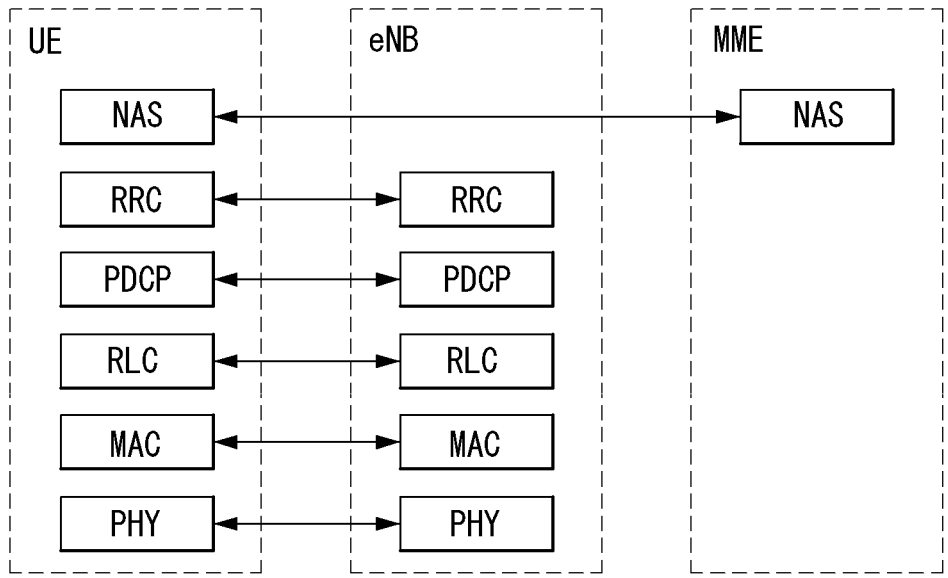
(a) control-plane protocol stack
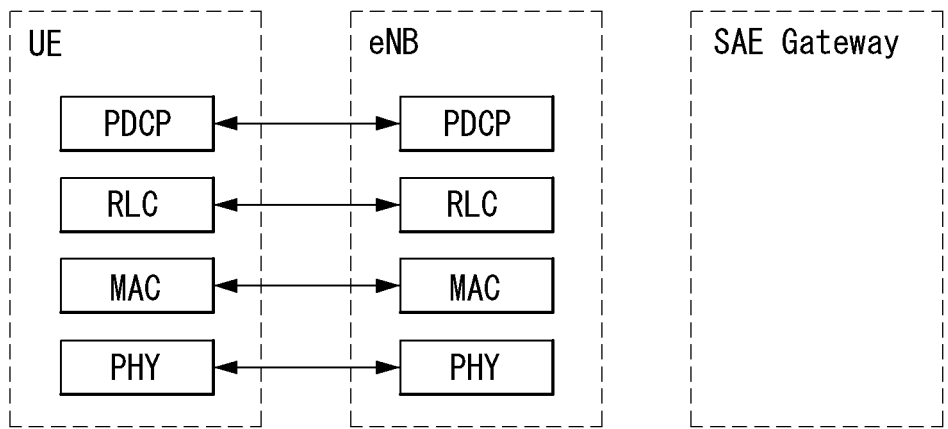
(b) user-plane protocol stack

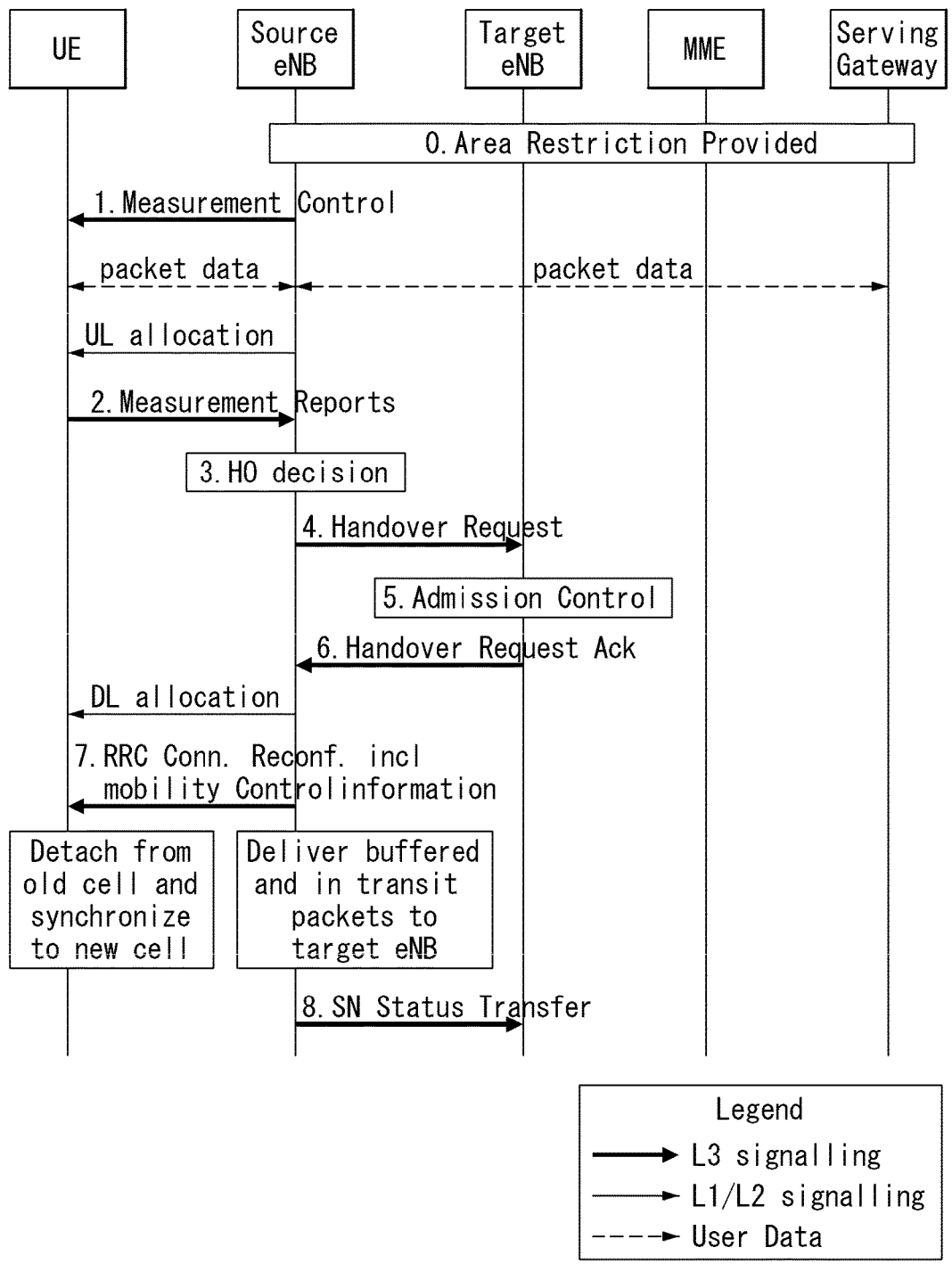
[FIG. 4]

[FIG. 5]
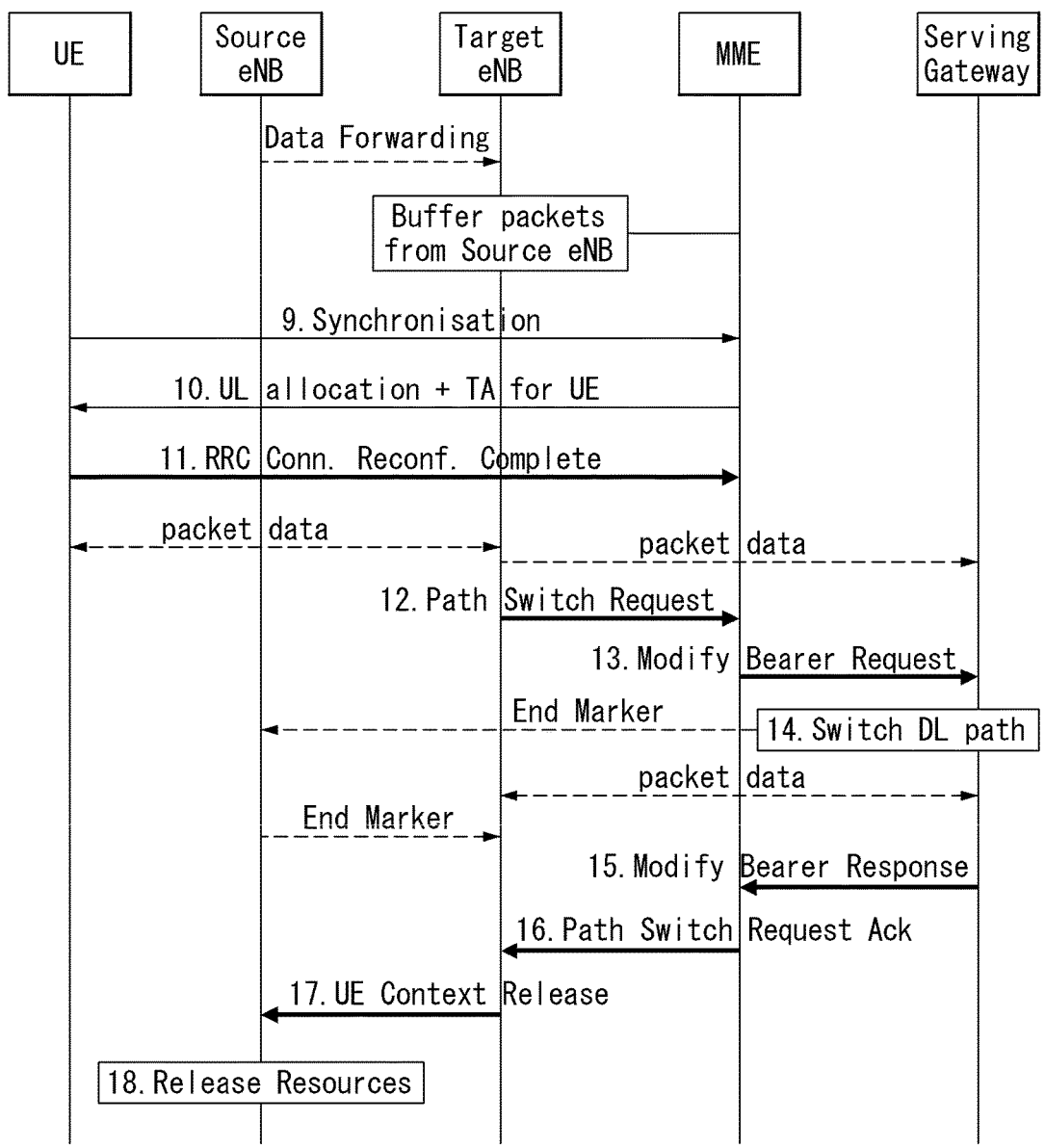

【FIG. 6】
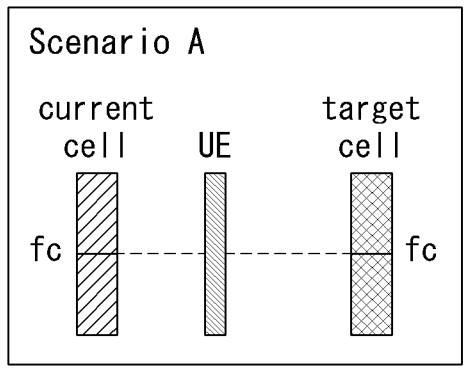
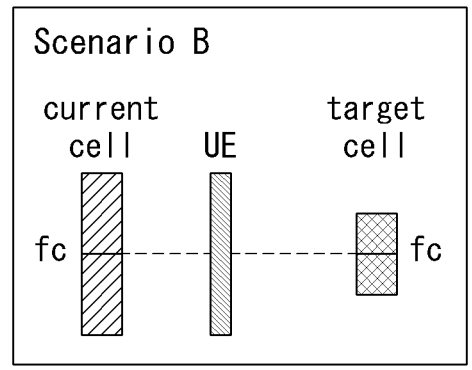
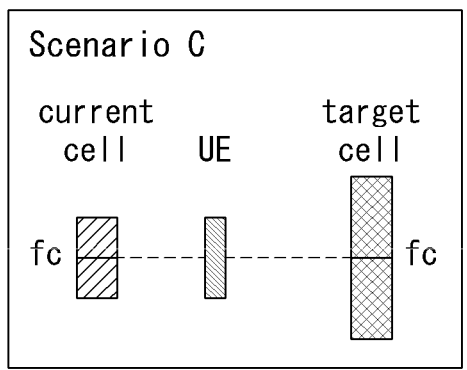
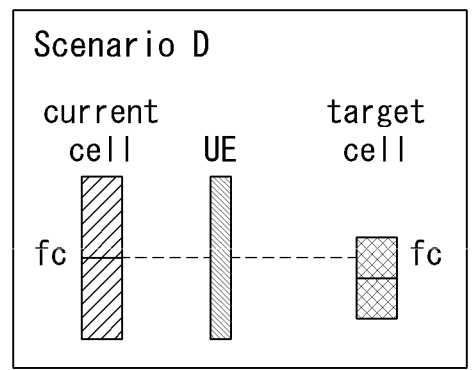
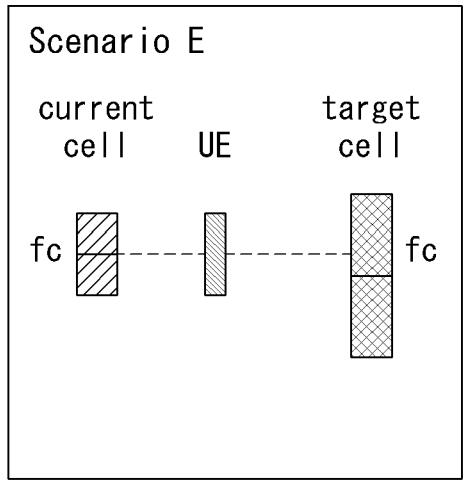
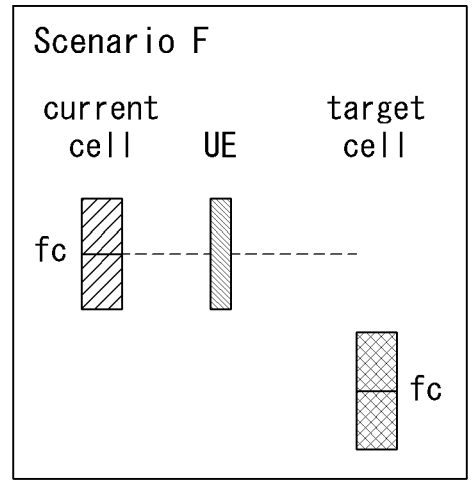

【FIG. 7】
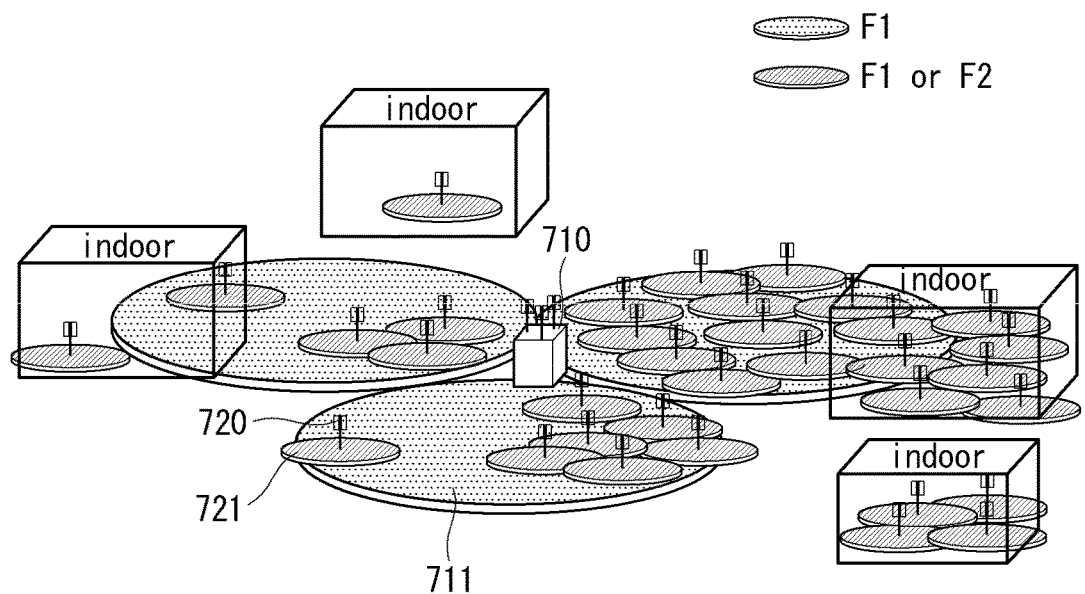
【FIG. 8】
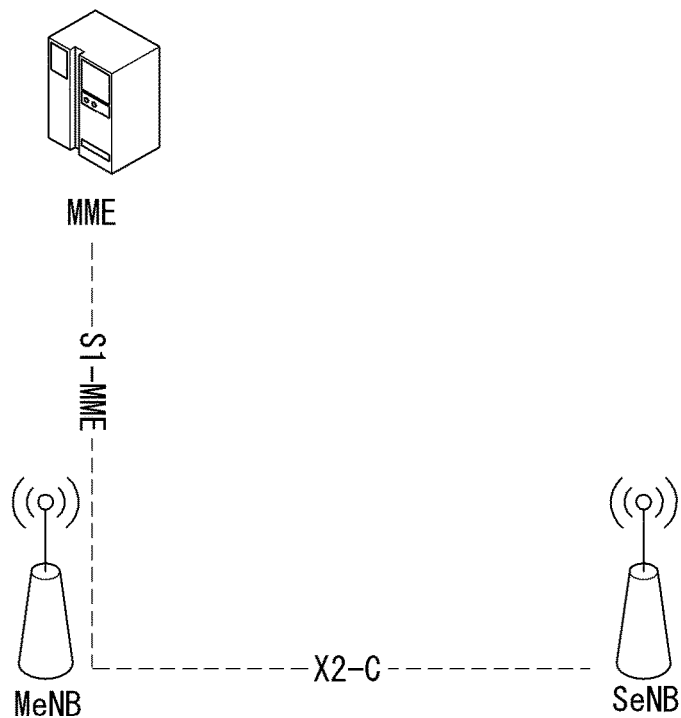

[FIG. 9]
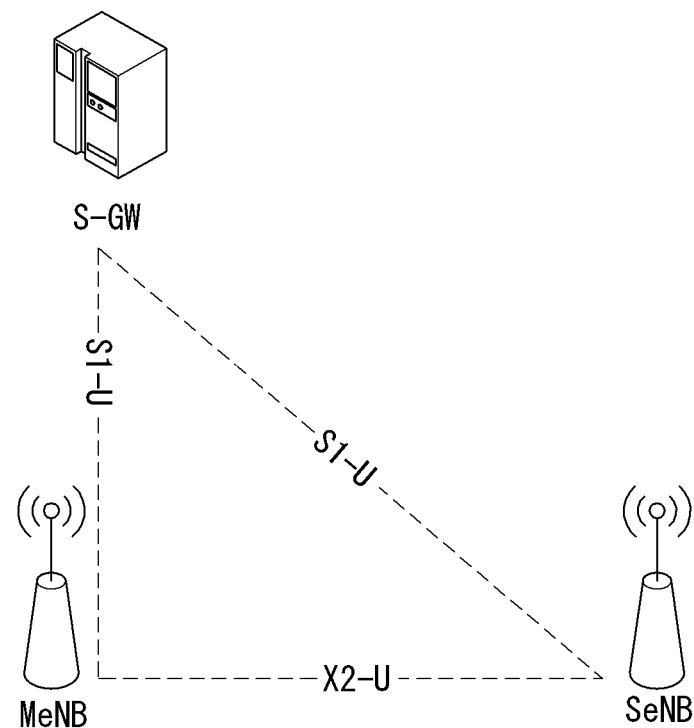
[FIG. 10]
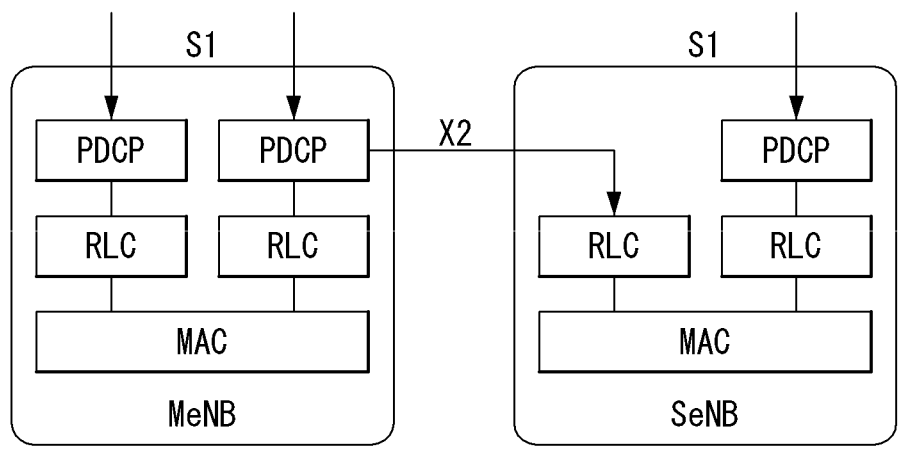

[FIG. 11]
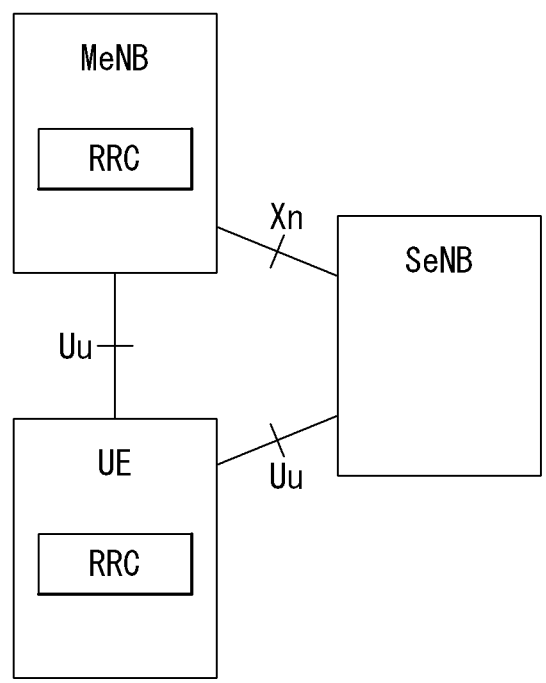

[FIG. 12]
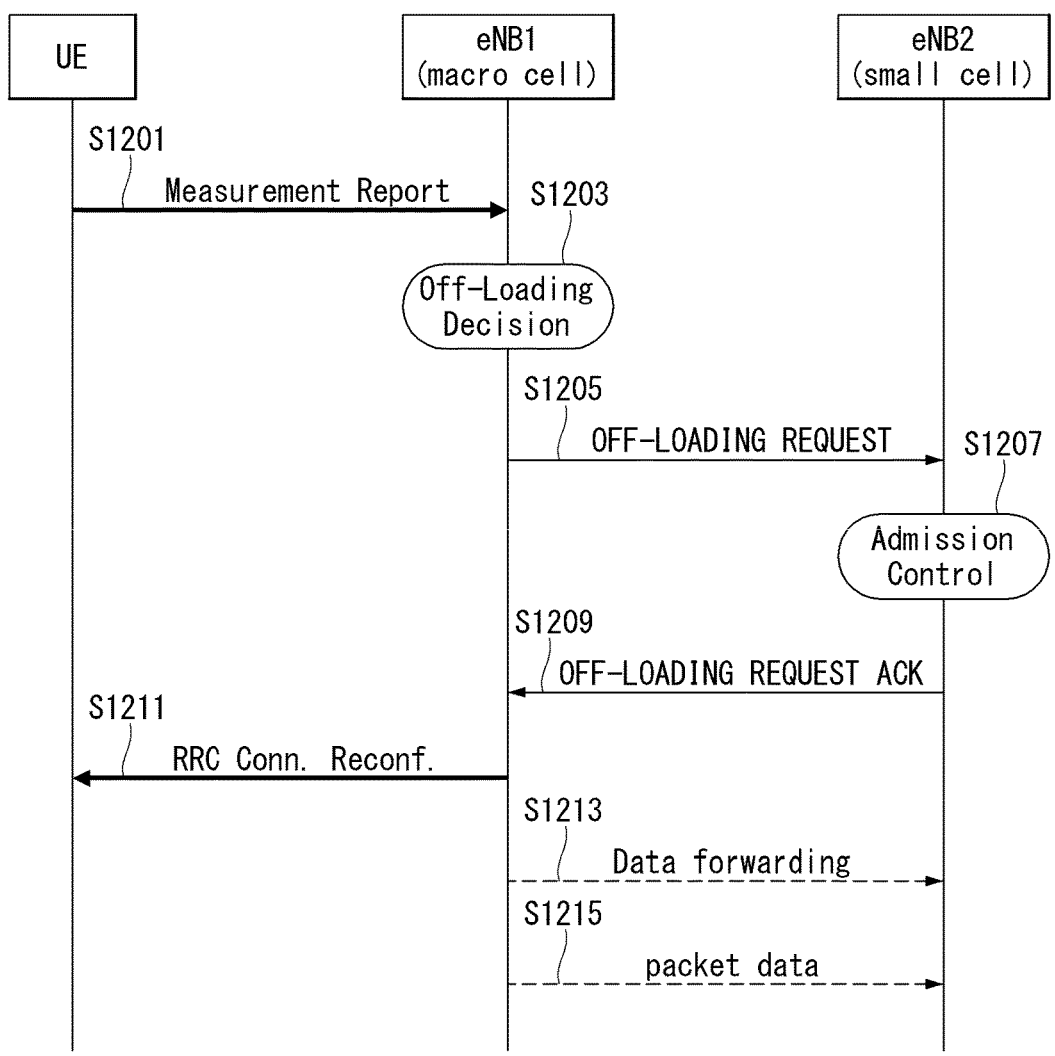

[FIG. 13]
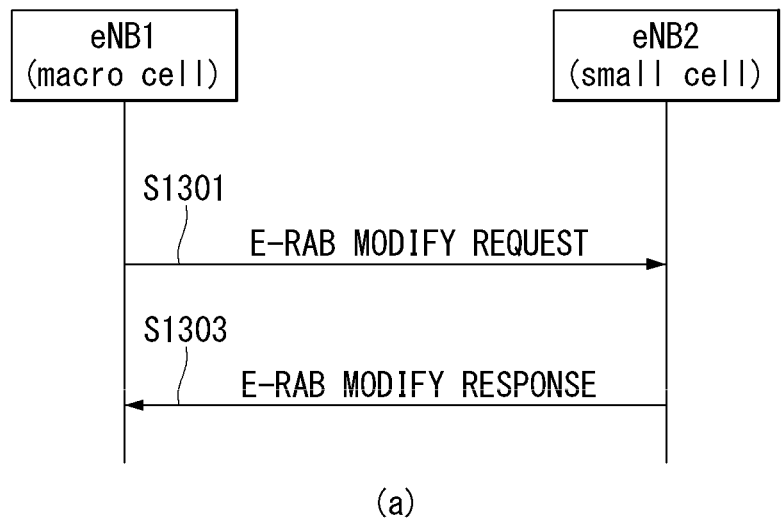
(a)
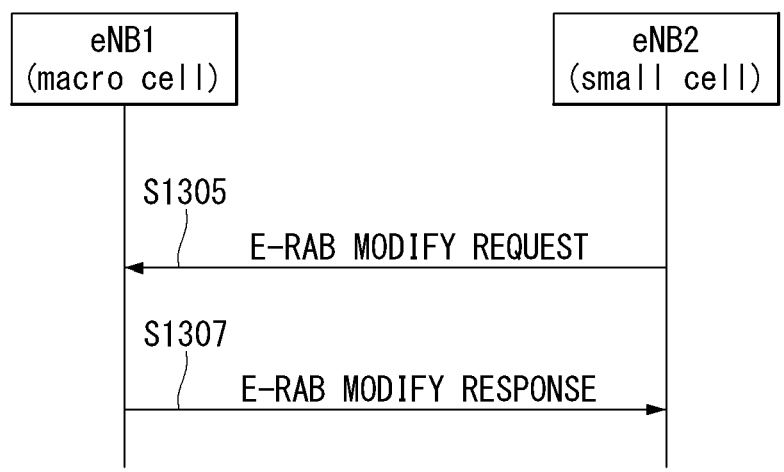
(b)

[FIG. 14]
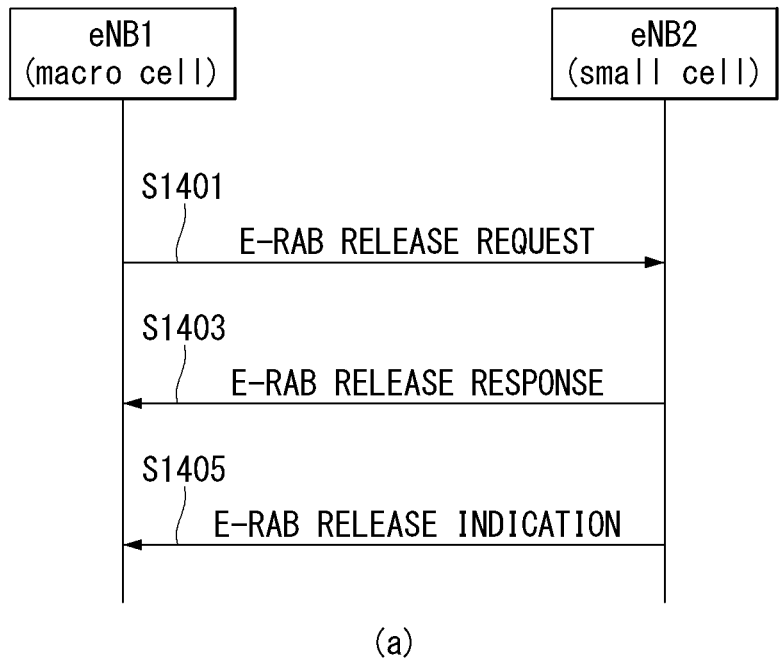
(a)
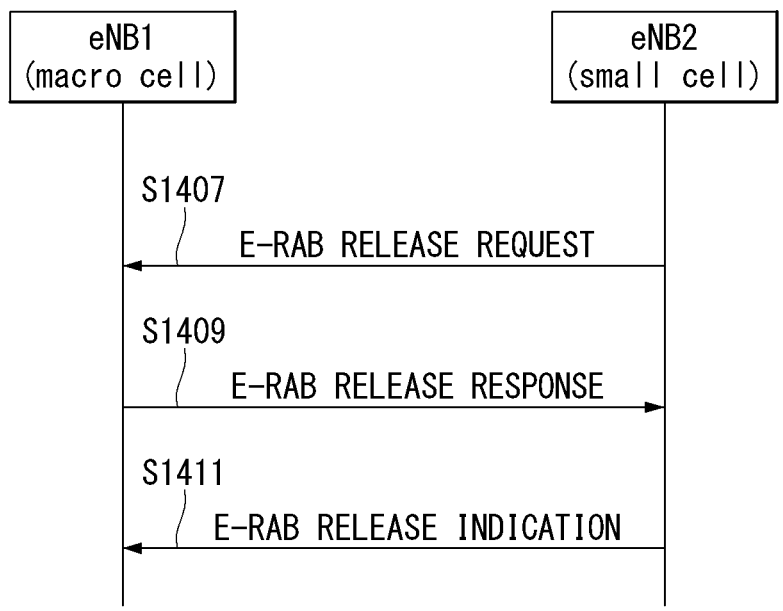
(b)

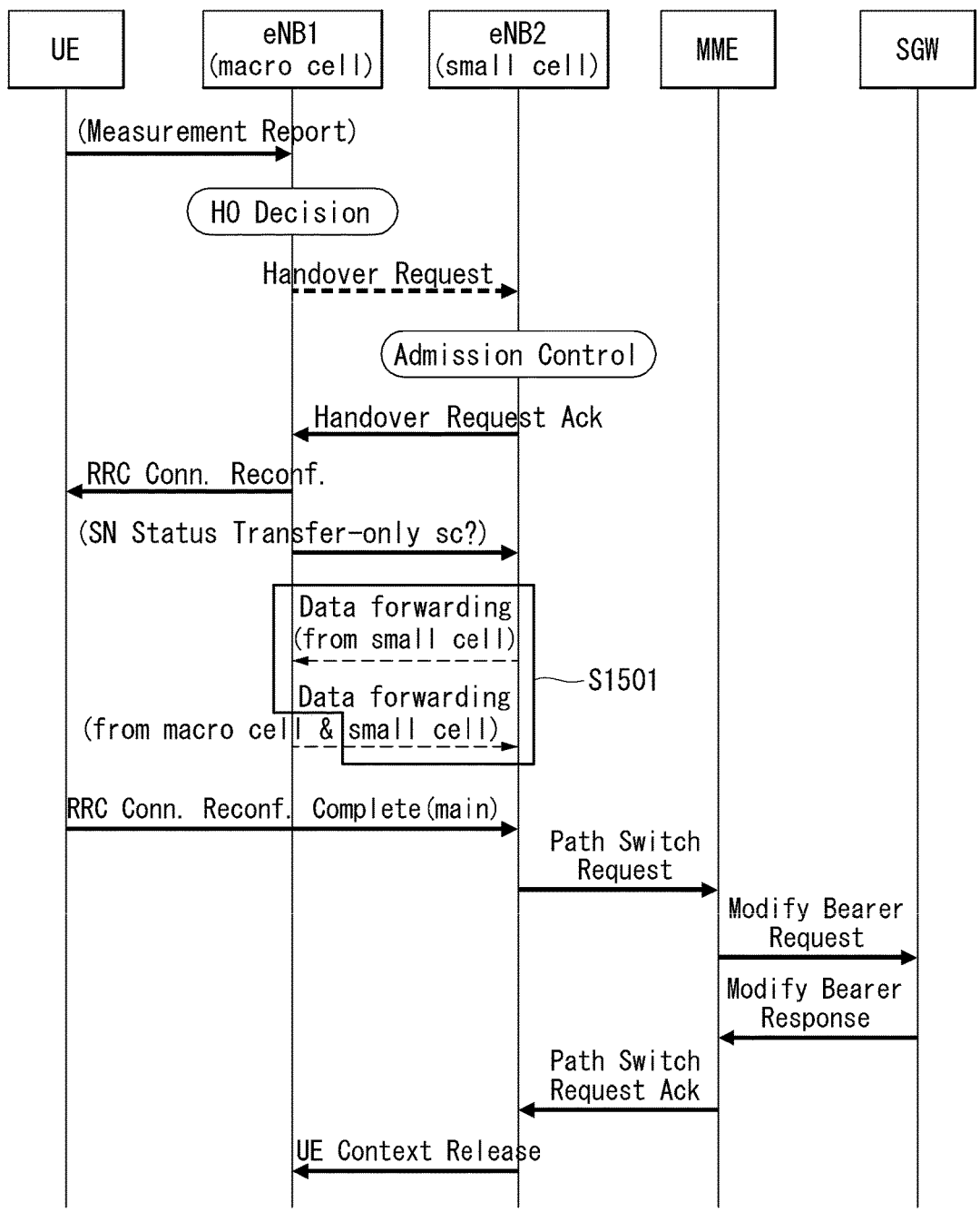
[FIG. 15]

【FIG. 16】
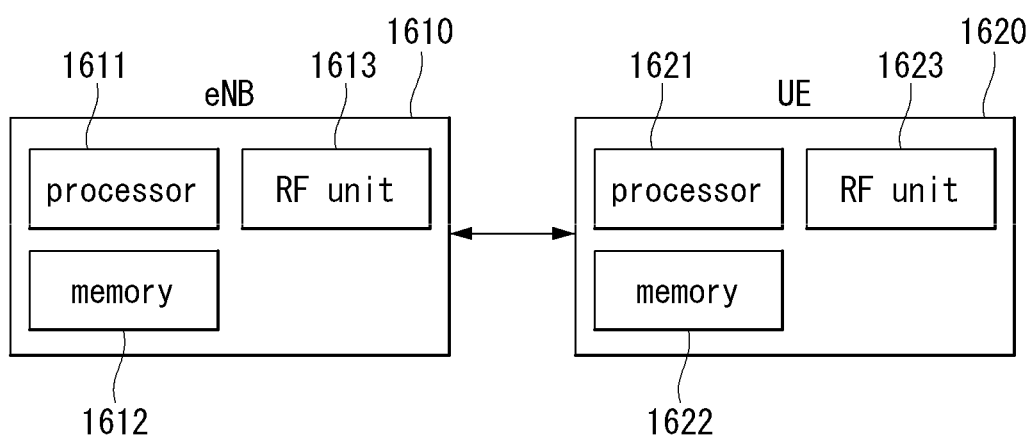

METHOD FOR DETERMINING RADIO RESOURCE CONTROL CONFIGURATION IN A WIRELESS COMMUNICATION SYSTEM SUPPORTING DUAL CONNECTIVITY AND APPARATUS THEREOF

This application is a continuation of, and claims priority to, U.S. patent application Ser. No.15/023,968, filed on Mar. 22, 2016, which is a 35 U.S.C. § 371 National Stage Entry of International Application No. PCT/KR2014/009236 filed Sep. 30, 2014, which claims benefit of and priority to U.S. Provisional Application Nos. 61/884,951 filed Sep. 30, 2013 and 61/910,008 filed Nov. 27, 2013, all of which are incorporated by reference for all purposes as if fully set forth herein.

TECHNICAL FIELD

The present invention relates to a wireless communication system and, more particularly, to a method for determining a radio resource control configuration in a wireless communication system supporting dual connectivity, and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

Requirements of a next-generation mobile communication system may include supporting huge data traffic, a remarkable increase in a transfer rate per user, accommodation of a significantly increased number of connection devices, very low end-to-end latency, high energy efficiency. To this end, various techniques such as small cell enhancement, dual connectivity, massive multiple input multiple output (MIMO), in-band full duplex, non-orthogonal multiple access (NOMA), supporting super-wide band, device networking, and the like, have been studied.

DISCLOSURE

Technical Problem

An object of the present invention is to provide an enhanced network operation efficiently supporting dual connectivity of a user equipment (UE).

Another object of the present invention is to provide a method for setting up a radio resource control (RRC) configuration for capability coordination of a UE between base stations supporting dual connectivity of a UE.

The technical problems solved by the present invention are not limited to the above technical problems and those skilled in the art may understand other technical problems from the following description.

Technical Solution

According to an aspect of the present invention, there is provided a method for determining, by a base station (BS), a radio resource control (RRC) configuration in a wireless communication system supporting dual connectivity, including transmitting, by a first BS, a first RRC configuration of a serving cell of the first BS or remained user equipment (UE) capability to a second BS configured for a UE, and receiving, by the first BS, a second RRC configuration of a serving cell of the second BS configured for the UE from the second BS, wherein the first BS and the second BS are involved in dual connectivity for the UE, and the second RRC configuration is determined by the second BS based on the first RRC configuration or the remained UE capability.

According to another aspect of the present invention, there is provided a method for determining, by a base station (BS), a radio resource control (RRC) configuration in a wireless communication system supporting dual connectivity, including receiving, by a second BS, a first RRC configuration of a serving cell of a first BS or remained user equipment (UE) capability configured for a UE from a first BS, and transmitting, by the second BS, a second RRC configuration of a serving cell of the second BS configured for the UE to the first BS, wherein the first BS and the second BS are involved in dual connectivity for the UE, and the second RRC configuration is determined by the first BS based on the first RRC configuration or the remained UE capability.

Preferably, the second RRC configuration may be determined such that a combination of the first RRC configuration and the second RRC configuration do not to exceed UE capability.

Preferably, the first RRC configuration for the UE may be configured by the first BS regarding the serving cell of the first BS.

Preferably, the remained UE capability of the UE may be obtained by the first BS after the first BS determines the RRC configuration regarding the serving cell of the first BS.

Preferably, the first RRC configuration may be transmitted through a message for requesting adding, correcting, or releasing a bearer from the first BS to the second BS.

Preferably, the message for requesting adding or correcting a bearer may include bearer split information and bearer split portion information, the bearer split information may indicate whether each bearer is split, and the bearer split information may indicate a ratio of traffic allocated to the second BS among the total traffic of the split bearer Preferably, the first BS may be a macro cell eNB, and the second BS may be a small cell eNB.

According to another aspect of the present invention, there is provided a method for performing a handover in a wireless communication system supporting dual connectivity, including transmitting, by a first base station (BS), a handover request message to a second BS when the first BS and the second BS are involved in dual connectivity for a user equipment (UE), wherein the handover request message includes an indication for notifying the second BS that the UE is under serving by the second BS which is taking a role of dual connectivity.

Preferably, the indication may be an SeNB UE X2AP ID.

Preferably, the indication is explicit information element (IE).

Preferably, the UE served by the first BS and the second BS together may be totally handed over to the second BS.

Preferably, the role of the second BS for the UE may be changed into a normal eNB from the role of dual connectivity supporting.

Advantageous Effects

According to embodiments of the present invention, dual connectivity of a UE may be smoothly supported by configuring a RRC configuration for capability coordination of the UE between base stations supporting UE dual connectivity in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 illustrates a schematic structure a network structure of an evolved universal mobile telecommunication system (E-UMTS) to which the present invention can be applied;

FIG. 2 illustrates architecture of a typical E-UTRAN and a typical EPC to which the present invention can be applied;

FIG. 3 illustrates the configurations of a control plane and a user plane of a radio interface protocol between the E-UTRAN and a UE in the wireless communication system to which the present invention can be applied;

FIGS. 4 and 5 illustrates Intra-MME/Serving Gateway handover procedure in the wireless communication system to which the present invention can be applied;

FIG. 6 illustrates Inter and Intra-frequency measurements scenarios in the wireless communication system to which the present invention can be applied;

FIG. 7 is a view schematically illustrating a small cell deployment scenario in the wireless communication system to which the present invention can be applied;

FIG. 8 illustrates Control Plane for Dual Connectivity in the wireless communication system to which the present invention can be applied;

FIG. 9 illustrates User Plane architecture for Dual Connectivity in the wireless communication system to which the present invention can be applied;

FIG. 10 illustrates architecture of radio interface protocol for Dual Connectivity between the E-UTRAN and a UE in the wireless communication system to which the present invention can be applied;

FIG. 11 illustrates Control plane architecture for Dual Connectivity in the wireless communication system to which the present invention can be applied;

FIG. 12 is a view illustrating an off-loading procedure for dual connection of a UE according to an embodiment of the present invention;

FIG. 13 is a view illustrating an E-RAB modification procedure for dual connection of a UE according to an embodiment of the present invention;

FIG. 14 is a view illustrating an E-RAB release procedure of a UE according to an embodiment of the present invention;

FIG. 15 is a view illustrating a handover procedure for dual connection of a UE.

FIG. 16 is a block diagram of a wireless communication apparatus according to an embodiment of the present invention.

BEST MODE

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. That is, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention can be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/Serving Gateways and eNBs.

FIG. 2 illustrates architecture of a typical E-UTRAN and a typical EPC to which the present invention can be applied.

Referring to the FIG. 2, the eNB may perform functions of selection for the gateway (for example, MME), routing toward the gateway during a radio resource control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, radio admission control (RAC), and connection mobility control in LTE_ACTIVE state. In the EPC, and as stated above, the gateway may perform functions of paging origination, LTE_IDLE state management, ciphering of the user plane, System Architecture Evolution (SAE) bearer control, and ciphering and integrity protection of NAS signaling.

FIG. 3 illustrates the configurations of a control plane and a user plane of a radio interface protocol between the E-UTRAN and a UE in the wireless communication system to which the present invention can be applied.

FIG. 3(a) shows the respective layers of the radio protocol control plane, and FIG. 3(b) shows the respective layers of the radio protocol user plane.

Referring to the FIG. 3, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/ NACK (Non-acknowledge), scheduling request (SR), channel quality indicator (CQI) report and the like.

NAS Protocol States (EMM & ECM)

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

Mobility Management in ECM-IDLE

Cell selection is required on transition from EMM-DEREGISTERED to EMM-REGISTERED and from ECM-IDLE or ECM-CONNECTED.

The UE NAS layer identifies a selected PLMN and equivalent PLMNs. The UE searches the E-UTRA frequency bands and for each carrier frequency identifies the strongest cell. It reads cell system information broadcast to identify its PLMN(s). The UE may search each carrier in turn ("initial cell selection") or make use of stored information to shorten the search ("stored information cell selection").

The UE seeks to identify a suitable cell. That is, if the UE is not able to identify a suitable cell the UE seeks to identify an acceptable cell. When a suitable cell is found or if only an acceptable cell is found, the UE camps on that cell and commence the cell reselection procedure. Here, the suitable cell is one for which the measured cell attributes satisfy the cell selection criteria. The cell PLMN is the selected PLMN, registered or an equivalent PLMN. The cell is not barred or reserved and the cell is not part of a tracking area which is in the list of "forbidden tracking areas for roaming". The acceptable cell is one for which the measured cell attributes satisfy the cell selection criteria and the cell is not barred.

On transition from RRC_CONNECTED to RRC_IDLE, the UE should camp on the last cell for which it was in RRC_CONNECTED or a cell/any cell of set of cells or frequency be assigned by RRC in the state transition message.

The UE should attempt to find a suitable cell in the manner described for stored information or initial cell selection above. If no suitable cell is found on any frequency or Radio Access Technology (RAT) the UE should attempt to find an acceptable cell.

In addition, a UE in RRC_IDLE performs cell reselection. The principles of the procedure are the following.

The UE makes measurements of attributes of the serving and neighbour cells to enable the reselection process. There is no need to indicate neighbouring cells in the serving cell system information to enable the UE to search and measure a cell i.e. E-UTRAN relies on the UE to detect the neighbouring cells. For the search and measurement of inter-frequency neighbouring cells, only the carrier frequencies need to be indicated. Measurements may be omitted if the serving cell attribute fulfils particular search or measurement criteria.

Cell reselection identifies the cell that the UE should camp on. It is based on cell reselection criteria which involves measurements of the serving and neighbour cells. Intra-frequency reselection is based on ranking of cells. On the other hand, Inter-frequency reselection is based on absolute priorities where a UE tries to camp on the highest priority frequency available. Absolute priorities for reselection are provided only by the registered PLMN (RPLMN) and are valid only within the RPLMN. Priorities are given by the system information and are valid for all UEs in a cell and specific priorities per UE can be signalled in the RRC Connection Release message. A validity time can be associated with UE specific priorities. For inter-frequency neighbouring cells, it is possible to indicate layer-specific cell reselection parameters (e.g., layer specific offset). These parameters are common to all neighbouring cells on a frequency.

Further, a neighbor cell list (NCL) can be provided by the serving cell to handle specific cases for intra-frequency and inter-frequency neighbouring cells. This NCL contains cell specific cell reselection parameters (e.g., cell specific offset) for specific neighbouring cells. Black lists can be provided to prevent the UE from reselecting to specific intra- and inter-frequency neighbouring cells. Cell reselection parameters are applicable for all UEs in a cell, but it is possible to configure specific reselection parameters per UE group or per UE. Cell access restrictions apply as for UTRAN, which consist of access class (AC) barring and cell reservation (e.g., for cells "reserved for operator use") applicable for mobiles in RRC_IDLE mode.

Mobility Management in ECM-CONNECTED

The Intra-E-UTRAN-Access Mobility Support for UEs in ECM-CONNECTED handles all necessary steps for handover procedures, like processes that precede the final handover (HO) decision on the source network side (control and evaluation of UE and eNB measurements taking into account certain UE specific area restrictions), preparation of resources on the target network side, commanding the UE to the new radio resources and finally releasing resources on the (old) source network side. It contains mechanisms to transfer context data between evolved nodes, and to update node relations on C-plane and U-plane.

In E-UTRAN RRC_CONNECTED state, network-controlled UE-assisted handovers are performed and various DRX cycles are supported.

The UE makes measurements of attributes of the serving and neighbour cells to enable the process. There is no need to indicate neighbouring cells to enable the UE to search and measure a cell i.e. E-UTRAN relies on the UE to detect the neighbouring cells. For the search and measurement of inter-frequency neighbouring cells, at least the carrier frequencies need to be indicated. The E-UTRAN signals reporting criteria for event-triggered and periodical reporting. A neighbor cell list (NCL) can be provided by the serving cell by RRC dedicated signalling to handle specific cases for intra- and inter-frequency neighbouring cells. This NCL contains cell specific measurement parameters (e.g., cell specific offset) for specific neighbouring cells. Black lists can be provided to prevent the UE from measuring specific neighbouring cells.

Depending on whether the UE needs transmission/reception gaps to perform the relevant measurements, measurements are classified as gap assisted or non-gap assisted. A non-gap assisted measurement is a measurement on a cell that does not require transmission/reception gaps to allow the measurement to be performed. A gap assisted measurement is a measurement on a cell that does require transmission/reception gaps to allow the measurement to be performed. Gap patterns (as opposed to individual gaps) are configured and activated by RRC.

Handover

The intra E-UTRAN HO of a UE in RRC_CONNECTED state is a UE-assisted network-controlled HO, with HO preparation signalling in E-UTRAN.

Part of the HO command comes from the target eNB and is transparently forwarded to the UE by the source eNB. To prepare the HO, the source eNB passes all necessary information to the target eNB (e.g., E-RAB (E-UTRAN radio access bearer) attributes and RRC context). When carrier aggregation (CA) is configured and to enable secondary cell (SCell) selection in the target eNB, the source eNB can provide in decreasing order of radio quality a list of the best cells and optionally measurement result of the cells. Both the source eNB and UE keep some context (e.g., cell radio network temporary identifier (C-RNTI)) to enable the return of the UE in case of HO failure. UE accesses the target cell via RACH following a contention-free procedure using a dedicated RACH preamble or following a contention-based procedure if dedicated RACH preambles are not available. The UE uses the dedicated preamble until the handover procedure is finished (successfully or unsuccessfully). If the RACH procedure towards the target cell is not successful within a certain time, the UE initiates radio link failure recovery using a suitable cell. No robust header compression (ROHC) context is transferred at handover. ROHC context can be kept at handover within the same eNB.

Regarding to C-plane handling, the preparation and execution phase of the HO procedure is performed without EPC involvement, i.e. preparation messages are directly exchanged between the eNBs. The release of the resources at the source side during the HO completion phase is triggered by the eNB. In case a relay node (RN) is involved, its donor eNB (DeNB) relays the appropriate S1 messages between the RN and the MME (S1-based handover) and X2 messages between the RN and target eNB (X2-based handover). The DeNB is explicitly aware of a UE attached to the RN due to the S1 proxy and X2 proxy functionality.

FIGS. 4 and 5 illustrates Intra-MME/Serving Gateway handover procedure in the wireless communication system to which the present invention can be applied.

Below is a more detailed description of the intra-MME/Serving Gateway HO procedure.

Step 0: The UE context within the source eNB contains information regarding roaming restrictions which were provided either at connection establishment or at the last TA (tracking area) update.

Step 1: The source eNB configures the UE measurement procedures according to the area restriction information. Measurements provided by the source eNB may assist the function controlling the UE's connection mobility.

Step 2: A MEASUREMENT REPORT is triggered and sent to the eNB.

Step 3: The source eNB makes decision based on MEASUREMENT REPORT and radio resource management (RRM) information to hand off the UE.

Step 4: The source eNB issues a HANDOVER REQUEST message to the target eNB passing necessary information to prepare the HO at the target side (UE X2 signalling context reference at source eNB, UE S1 EPC signalling context reference, target cell ID, eNB key ($K_{eNB}$), RRC context including the C-RNTI of the UE in the source eNB, AS(access stratum)-configuration, E-RAB context and physical layer ID of the source cell+short MAC-I for possible RLF recovery). UE X2/UE S1 signalling references enable the target eNB to address the source eNB and the EPC. The E-RAB context includes necessary radio network layer (RNL) and transport network layer (TNL) addressing information, and QoS profiles of the E-RABs.

Step 5: Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

Step 6: The target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, system information blocks (SIBs), etc. The HANDOVER REQUEST ACKNOWLEDGE message may also include RNL/TNL information for the forwarding tunnels, if necessary. Here, as soon as the source eNB receives the HANDOVER REQUEST ACKNOWLEDGE, or as soon as the transmission of the handover command is initiated in the downlink, data forwarding may be initiated.

Steps 7 to 16 provide means to avoid data loss during HO and are further detailed later.

Step 7: The target eNB generates the RRC message to perform the handover, i.e RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBS, etc.) and is commanded by the source eNB to perform the HO. The UE does not need to delay the handover execution for delivering the HARQ/ARQ responses to source eNB.

Step 8: The source eNB sends the SN (sequence number) STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL service data unit (SDU) and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

Step 9: After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

Step 10: The target eNB responds with UL allocation and timing advance.

Step 11: When the UE has successfully accessed the target cell, the UE sends the RRCConnectionReconfiguration-Complete message (C-RNTI) to confirm the handover, along with an uplink Buffer Status Report (BSR), whenever possible, to the target eNB to indicate that the handover procedure is completed for the UE. The target eNB verifies the C-RNTI sent in the RRCConnectionReconfiguration-Complete message. The target eNB can now begin sending data to the UE.

Step 12: The target eNB sends a PATH SWITCH REQUEST message to MME to inform that the UE has changed cell.

Step 13: The MME sends a MODIFY BEARER REQUEST message to the Serving Gateway.

Step 14: The Serving Gateway switches the downlink data path to the target side. The Serving gateway sends one or more "end marker" packets on the old path to the source eNB and then can release any U-plane/TNL resources towards the source eNB.

Step 15: The Serving Gateway sends a MODIFY BEARER RESPONSE message to MME.

Step 16: The MME confirms the PATH SWITCH REQUEST message with the PATH SWITCH REQUEST ACKNOWLEDGE message.

Step 17: By sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

Step 18: Upon reception of the UE CONTEXT RELEASE message, the source eNB can release radio and C-plane related resources associated to the UE context. Any ongoing data forwarding may continue.

When an X2 handover is used involving Home eNBs (HeNBs) and when the source HeNB is connected to a HeNB GW, a UE CONTEXT RELEASE REQUEST message including an explicit GW Context Release Indication is sent by the source HeNB, in order to indicate that the HeNB GW may release of all the resources related to the UE context.

The U-plane handling during the Intra-E-UTRAN-Access mobility activity for UEs in ECM-CONNECTED takes the following principles into account to avoid data loss during HO. During HO preparation U-plane tunnels can be established between the source eNB and the target eNB. There is one tunnel established for uplink data forwarding and another one for downlink data forwarding for each E-RAB for which data forwarding is applied. In the case of a UE under an RN performing handover, forwarding tunnels can be established between the RN and the target eNB via the DeNB. During HO execution, user data can be forwarded from the source eNB to the target eNB. The forwarding may take place in a service and deployment dependent and implementation specific way. Forwarding of downlink user data from the source to the target eNB should take place in order as long as packets are received at the source eNB from the EPC or the source eNB buffer has not been emptied.

During HO completion, the target eNB sends a PATH SWITCH message to MME to inform that the UE has gained access and MME sends a MODIFY BEARER REQUEST message to the Serving Gateway, the U-plane path is switched by the Serving Gateway from the source eNB to the target eNB. Further, the source eNB should continue forwarding of U-plane data as long as packets are received at the source eNB from the Serving Gateway or the source eNB buffer has not been emptied.

Below is a more detailed description regarding to RLC-AM bearers.

During normal HO not involving Full Configuration, for in-sequence delivery and duplication avoidance, PDCP SN is maintained on a bearer basis and the source eNB informs the target eNB about the next DL PDCP SN to allocate to a packet which does not have a PDCP sequence number yet (either from source eNB or from the Serving Gateway). For security synchronization, hyper frame number (HFN) is also maintained and the source eNB provides to the target one reference HFN for the UL and one for the DL i.e. HFN and corresponding SN. In both the UE and the target eNB, a window-based mechanism is needed for duplication detection. The occurrence of duplicates over the air interface in the target eNB is minimised by means of PDCP SN based reporting at the target eNB by the UE. In uplink, the reporting is optionally configured on a bearer basis by the eNB and the UE should first start by transmitting those reports when granted resources in the target eNB. In downlink, the eNB is free to decide when and for which bearers a report is sent and the UE does not wait for the report to resume uplink transmission. The target eNB re-transmits and prioritizes all downlink PDCP SDUs forwarded by the source eNB (i.e. the target eNB should send data with PDCP SNs from X2 before sending data from S1), with the exception of PDCP SDUs of which the reception was acknowledged through PDCP SN based reporting by the UE. The UE re-transmits in the target eNB all uplink PDCP SDUs starting from the first PDCP SDU following the last consecutively confirmed PDCP SDU i.e. the oldest PDCP SDU that has not been acknowledged at RLC in the source, excluding the PDCP SDUs of which the reception was acknowledged through PDCP SN based reporting by the target.

On the other hand, during HO involving Full Configuration, the following description below for RLC-UM bearers also applies for RLC-AM bearers. Data loss may happen.

Below is a more detailed description regarding to RLC-UM bearers.

The PDCP SN and HFN are reset in the target eNB. No PDCP SDUs are retransmitted in the target eNB. The target eNB prioritizes all downlink PDCP SDUs forwarded by the source eNB if any (i.e. the target eNB should send data with PDCP SNs from X2 before sending data from S1). The UE PDCP entity does not attempt to retransmit any PDCP SDU in the target cell for which transmission had been completed in the source cell. Instead UE PDCP entity starts the transmission with other PDCP SDUs.

Path Switch

After the downlink path is switched at the Serving GW downlink packets on the forwarding path and on the new direct path may arrive interchanged at the target eNB. The target eNB should first deliver all forwarded packets to the UE before delivering any of the packets received on the new direct path. The method employed in the target eNB to enforce the correct delivery order of packets is outside the scope of the standard.

In order to assist the reordering function in the target eNB, the Serving GW shall send one or more "end marker" packets on the old path immediately after switching the path for each E-RAB of the UE. The "end marker" packet shall not contain user data. The "end marker" is indicated in the GPRS Tunneling Protocol (GTP) header. After completing the sending of the tagged packets the GW shall not send any further user data packets via the old path.

Upon receiving the "end marker" packets, the source eNB shall, if forwarding is activated for that bearer, forward the packet toward the target eNB.

On detection of an "end marker" the target eNB shall discard the end marker packet and initiate any necessary processing to maintain in sequence delivery of user data forwarded over X2 interface and user data received from the serving GW over S1 as a result of the path switch.

On detection of the "end marker", the target eNB may also initiate the release of the data forwarding resource. However, the release of the data forwarding resource is implementation dependent and could also be based on other mechanisms (e.g., timer-based mechanism).

EPC may change the uplink end-point of the tunnels with Path Switch procedure. However, the EPC should keep the old GTP tunnel end-point(s) sufficiently long time in order to minimise the probability of packet losses and avoid unintentional release of respective E-RAB(s).

Data Forwarding

Below is a more detailed description regarding to RLC-AM DRBs.

Upon handover, the source eNB may forward in order to the target eNB all downlink PDCP SDUs with their SN that have not been acknowledged by the UE. In addition, the source eNB may also forward without a PDCP SN fresh data arriving over S1 to the target eNB. Here, the target eNB does not have to wait for the completion of forwarding from the source eNB before it begins transmitting packets to the UE.

The source eNB discards any remaining downlink RLC PDUs. Correspondingly, the source eNB does not forward the downlink RLC context to the target eNB. Here, the source eNB does not need to abort ongoing RLC transmissions with the UE as it starts data forwarding to the target eNB.

Upon handover, the source eNB forwards to the Serving Gateway the uplink PDCP SDUs successfully received in-sequence until the sending of the Status Transfer message to the target eNB. Then at that point of time the source eNB stops delivering uplink PDCP SDUs to the S-GW and shall discard any remaining uplink RLC PDUs. Correspondingly, the source eNB does not forward the uplink RLC context to the target eNB.

Then the source eNB shall either discard the uplink PDCP SDUs received out of sequence if the source eNB has not accepted the request from the target eNB for uplink forwarding or if the target eNB has not requested uplink forwarding for the bearer during the Handover Preparation procedure, or forward to the target eNB the uplink PDCP SDUs received out of sequence if the source eNB has accepted the request from the target eNB for uplink forwarding for the bearer during the Handover Preparation procedure.

The PDCP SN of forwarded SDUs is carried in the "PDCP PDU number" field of the GTP-U extension header. The target eNB shall use the PDCP SN if it is available in the forwarded GTP-U packet.

For normal HO in-sequence delivery of upper layer PDUs during handover is based on a continuous PDCP SN and is provided by the "in-order delivery and duplicate elimination" function at the PDCP layer. In the downlink, the "in-order delivery and duplicate elimination" function at the UE PDCP layer guarantees in-sequence delivery of downlink PDCP SDUs. On the other hand, in the uplink, the "in-order delivery and duplicate elimination" function at the target eNB PDCP layer guarantees in-sequence delivery of uplink PDCP SDUs.

After a normal handover, when the UE receives a PDCP SDU from the target eNB, it can deliver it to higher layer together with all PDCP SDUs with lower SNs regardless of possible gaps.

For handovers involving Full Configuration, the source eNB behaviour is unchanged from the description above. The target eNB may not send PDCP SDUs for which delivery was attempted by the source eNB. The target eNB identifies these by the presence of the PDCP SN in the forwarded GTP-U packet and discards them.

After a Full Configuration handover, the UE delivers received PDCP SDU from the source cell to the higher layer regardless of possible gaps. UE discards uplink PDCP SDUs for which transmission was attempted and retransmission of these over the target cell is not possible.

Below is a more detailed description regarding to RLC-UM DRBs.

Upon handover, the source eNB does not forward to the target eNB downlink PDCP SDUs for which transmission had been completed in the source cell. PDCP SDUs that have not been transmitted may be forwarded. In addition, the source eNB may forward fresh downlink data arriving over S1 to the target eNB. The source eNB discards any remaining downlink RLC PDUs. Correspondingly, the source eNB does not forward the downlink RLC context to the target eNB.

Upon handover, the source eNB forwards all uplink PDCP SDUs successfully received to the Serving Gateway (i.e. including the ones received out of sequence) and discards any remaining uplink RLC PDUs. Correspondingly, the source eNB does not forward the uplink RLC context to the target eNB.

With respect to SRBs, the following principles apply at HO, no forwarding or retransmissions of RRC messages in the target, and the PDCP SN and HFN are reset in the target.

Timing Advance

In RRC_CONNECTED, the eNB is responsible for maintaining the timing advance. Serving cells having UL to which the same timing advance applies (typically corresponding to the serving cells hosted by the same receiver) and using the same timing reference cell are grouped in a timing advance group (TAG). Each TAG contains at least one serving cell with configured uplink, and the mapping of each serving cell to a TAG is configured by RRC.

In some cases (e.g., during DRX), the timing advance is not necessarily always maintained and the MAC sublayer knows if the L1 is synchronised and which procedure to use to start transmitting in the uplink. Thus, as long as the L1 is non-synchronised, uplink transmission can only take place on PRACH.

For a TAG, cases where the UL synchronisation status moves from "synchronized" to "non-synchronized" include expiration of a timer specific to the TAG and Non-synchronized handover;

The synchronisation status of the UE follows the synchronisation status of the primary TAG (pTAG). When the timer associated with pTAG is not running, the timer associated with a secondary TAG (sTAG) shall not be running.

The value of the timer associated to the pTAG is either UE specific and managed through dedicated signalling between the UE and the eNB, or cell specific and indicated via broadcast information. In both cases, the timer is normally restarted whenever a new timing advance is given by the eNB for the pTAG. Here, the timer may be restarted to a UE specific value if any, or restarted to a cell specific value otherwise.

The value of the timer associated to a sTAG is managed through dedicated signalling between the UE and the eNB, and the timers associated to different sTAGs can be configured with different values. The timer of a sTAG is normally restarted whenever a new timing advance is given by the eNB for the corresponding sTAG.

Upon DL data arrival or for positioning purpose, a dedicated signature on PRACH can be allocated by the eNB to the UE. When a dedicated signature on PRACH is allocated, the UE shall perform the corresponding random access procedure regardless of its L1 synchronisation status.

Timing advance updates are signalled by the eNB to the UE in MAC PDUs.

Measurements

Measurements to be performed by a UE for intra/inter-frequency mobility can be controlled by E-UTRAN, using broadcast or dedicated control. In RRC_IDLE state, a UE shall follow the measurement parameters defined for cell reselection specified by the E-UTRAN broadcast. The use of dedicated measurement control for RRC_IDLE state is possible through the provision of UE specific priorities. In RRC_CONNECTED state, a UE shall follow the measurement configurations specified by RRC directed from the E-UTRAN (e.g., as in UTRAN MEASUREMENT_CONTROL).

Intra-frequency neighbour (cell) measurements and inter-frequency neighbour (cell) measurements are defined as follows.

Regarding Intra-frequency neighbour (cell) measurements, neighbour cell measurements performed by the UE are intra-frequency measurements when the current and target cell operates on the same carrier frequency. The UE shall be able to carry out such measurements without measurement gaps. On the other hand, regarding Inter-frequency neighbour (cell) measurements, neighbour cell measurements performed by the UE are inter-frequency measurements when the neighbour cell operates on a different carrier frequency, compared to the current cell. The UE should not be assumed to be able to carry out such measurements without measurement gaps.

Whether a measurement is non gap assisted or gap assisted depends on the UE's capability and the current operating frequency. The UE determines whether a particular cell measurement needs to be performed in a transmission/reception gap and the scheduler needs to know whether gaps are needed.

FIG. 6 illustrates Inter and Intra-frequency measurements scenarios in the wireless communication system to which the present invention can be applied.

Same carrier frequency and cell bandwidths (Scenario A): an intra-frequency scenario; not measurement gap assisted.

Same carrier frequency, bandwidth of the target cell smaller than the bandwidth of the current cell (Scenario B): an intra-frequency scenario; not measurement gap assisted.

Same carrier frequency, bandwidth of the target cell larger than the bandwidth of the current cell (Scenario C): an intra-frequency scenario; not measurement gap assisted.

Different carrier frequencies, bandwidth of the target cell smaller than the bandwidth of the current cell and bandwidth of the target cell within bandwidth of the current cell (Scenario D): an inter-frequency scenario; measurement gap-assisted scenario.

Different carrier frequencies, bandwidth of the target cell larger than the bandwidth of the current cell and bandwidth of the current cell within bandwidth of the target cell (Scenario E): an inter-frequency scenario; measurement gap-assisted scenario.

Different carrier frequencies and non-overlapping bandwidth, (Scenario F): an inter-frequency scenario; measurement gap-assisted scenario.

Measurement gaps patterns are configured and activated by RRC.

When CA is configured, the "current cell" above refers to any serving cell of the configured set of serving cells. For instance, for the definition of intra and inter frequency measurements, this means as follows.

Regarding Intra-frequency neighbour (cell) measurements, neighbour cell measurements performed by the UE are intra-frequency measurements when one of the serving cells of the configured set and the target cell operates on the same carrier frequency. The UE shall be able to carry out such measurements without measurement gaps. On the other hand, regarding Inter-frequency neighbour (cell) measurements, Neighbour cell measurements performed by the UE are inter-frequency measurements when the neighbour cell operates on a different carrier frequency than any serving cell of the configured set. The UE should not be assumed to be able to carry out such measurements without measurement gaps.

In case of Intra-frequency neighbour (cell) measurements, in a system with frequency reuse=1, mobility within the same frequency layer (i.e. between cells with the same carrier frequency) is predominant. Good neighbour cell measurements are needed for cells that have the same carrier frequency as the serving cell in order to ensure good mobility support and easy network deployment. Search for neighbour cells with the same carrier frequency as the serving cell, and measurements of the relevant quantities for identified cells are needed. To avoid UE activity outside the DRX cycle, the reporting criteria for neighbour cell measurements should match the used DRX cycle.

On the contrary, in case of Inter-frequency neighbour (cell) measurements, regarding mobility between different frequency layers (i.e. between cells with a different carrier frequency), UE may need to perform neighbour cell measurements during DL/UL idle periods that are provided by DRX or packet scheduling (i.e. gap assisted measurements).

Small Cell Enhancement

In order to accommodate explosively increasing data traffic, research into a small cell enhancement technique to cover a relatively small area using small amount of power, relative to an existing macro cell, has been actively conducted.

Small cell enhancement refers to a technique of densely disposing small cells within macro cell coverage (or without macro cell coverage in case of the interior of a building, or the like) and maximizing spectrum efficiency per unit area through close cooperation between a macro cell eNB and a small cell eNB or between small cell eNBs to enable effective mobility management, while accommodating explosively increasing traffic. In particular, there is huge communication demand in a particular area such as a so-called hot spot within a cell, and receive sensitivity of propagation may be degraded in a particular area such as a cell edge or a coverage hole, and thus, a small cell may be used in a communication shadow area not covered by only a macro cell or an area, such as a hot spot, in which a large amount of data services is requested.

A macro cell eNB may also be called macro eNB (MeNB), and a small cell eNB may also be called small eNB, secondary eNB (SeNB), pico eNB, femto eNB, micro eNB, a remote radio head (RRH), a relay, a repeater, or the like. In this manner, a network in which macro cells and small cells coexist is called a heterogeneous network (Het-Net).

FIG. 7 is a view schematically illustrating a small cell deployment scenario in the wireless communication system to which the present invention can be applied.

Referring to FIG. 7, an MeNB 710 provides a wireless communication environment to a UE within coverage of a macro cell area 711, and an SeNB 720 provides a wireless communication environment to a UE within coverage of a small cell area 721.

As illustrated in FIG. 7, coverage of the macro cell area 711 and coverage of the small cell region 721 may overlap or may not, and a carrier frequency F1 supported by the MeNB 710 and a carrier frequency supported by the SeNB 720 may be identical (when the SeNB supports F1) or may not (when the SeNB supports F2). Both ideal backhaul and non-ideal backhaul may be supported between the MeNB and the SeNB or between a plurality of SeNBs. Also, both a dense or sparse small cell deployment may be considered and both indoor and outdoor small cell deployment may be considered. In FIG. 7, the macro cell area 711 and the small cell area 721 are merely illustrative, and different numbers or sizes of the macro cell areas and the small cell areas may be deployed.

Small cell enhancement considers all of various scenarios as described above with respect to the small cell deployment. This will be described in detail hereinafter.

With and without Macro Coverage

Small cell enhancement considers both with and without macro coverage. More specifically, Small cell enhancement is considered the deployment scenario in which small cell nodes are deployed under the coverage of one or more than one overlaid E-UTRAN macro-cell layer(s) in order to boost the capacity of already deployed cellular network. Two scenarios can be considered in the deployment scenario with macro coverage, where the UE is in coverage of both the macro cell and the small cell simultaneously and where the UE is not in coverage of both the macro cell and the small cell simultaneously. Also, Small cell enhancement is considered the deployment scenario where small cell nodes are not deployed under the coverage of one or more overlaid E-UTRAN macro-cell layer(s).

Outdoor and Indoor

Small cell enhancement considers both outdoor and indoor small cell deployments. The small cell nodes could be deployed indoors or outdoors, and in either case could provide service to indoor or outdoor UEs. For indoor UE, only low UE speed (i.e., 0-3 km/h) can be considered. On the contrary, for outdoor, not only low UE speed, but also medium UE speed (i.e., up to 30 km/h and potentially higher speeds) should be considered.

Ideal and Non-ideal Backhaul

Small cell enhancement considers both ideal backhaul (i.e., very high throughput and very low latency backhaul such as dedicated point-to-point connection using optical fiber) and non-ideal backhaul (i.e., typical backhaul widely used in the market such as xDSL, microwave, and other backhauls like relaying). The performance-cost trade-off should be taken into account.

Sparse and Dense

Small cell enhancement considers sparse and dense small cell deployments. In some scenarios (e.g., hotspot indoor/outdoor places, etc.), single or a few small cell node(s) are sparsely deployed, e.g., to cover the hotspot(s). Meanwhile, in some scenarios (e.g., dense urban, large shopping mall, etc.), a lot of small cell nodes are densely deployed to support huge traffic over a relatively wide area covered by the small cell nodes. The coverage of the small cell layer is generally discontinuous between different hotspot areas. Each hotspot area can be covered by a group of small cells, i.e. a small cell cluster.

Synchronization

Both synchronized and un-synchronized scenarios are considered between small cells as well as between small cells and macro cell(s). For specific operations e.g., interference coordination, carrier aggregation (CA) and inter-eNB COMP, small cell enhancement can benefit from synchronized deployments with respect to small cell search/measurements and interference/resource management.

Spectrum

Small cell enhancement addresses the deployment scenario in which different frequency bands are separately assigned to macro layer and small cell layer, respectively. Small cell enhancement can be applicable to all existing and as well as future cellular bands, with special focus on higher frequency bands, e.g., the 3.5 GHz band, to enjoy the more available spectrum and wider bandwidth. Small cell enhancement can also take into account the possibility for frequency bands that, at least locally, are only used for small cell deployments.

Co-channel deployment scenarios between macro layer and small cell layer should be considered as well. Some example spectrum configurations can be considered as follow.

Carrier aggregation on the macro layer with bands X and Y, and only band X on the small cell layer Small cells supporting carrier aggregation bands that are co-channel with the macro layer Small cells supporting carrier aggregation bands that are not co-channel with the macro layer.

Small cell enhancement should be supported irrespective of duplex schemes (FDD/TDD) for the frequency bands for macro layer and small cell layer. Air interface and solutions for small cell enhancement should be band-independent.

Traffic

In a small cell deployment, it is likely that the traffic is fluctuating greatly since the number of users per small cell node is typically not so large due to small coverage. In a small cell deployment, it is likely that the user distribution is very fluctuating between the small cell nodes. It is also expected that the traffic could be highly asymmetrical, either downlink or uplink centric. Thus, both uniform and non-uniform traffic load distribution in time-domain and spatial-domain are considered.

Dual Connectivity

In the heterogeneous networks which supports small cell enhancement, there are various requirements related to mobility robustness, increased signalling load due to frequent handover and improving per-user throughput and system capacity, etc.

As a solution to realize these requirements, E-UTRAN supports Dual Connectivity (DC) operation whereby a multiple RX/TX UE in RRC_CONNECTED is configured to utilize radio resources provided by two distinct schedulers, located in two eNBs connected via a non-ideal backhaul over the X2 interface. The Dual connectivity may imply Control and Data separation where, for instance, the control signaling for mobility is provided via the macro cell at the same time as high-speed data connectivity is provided via the small cell. Also, a separation between downlink and uplink, the downlink and uplink connectivity is provided via different cells.

eNBs involved in dual connectivity for a certain UE may assume two different roles, i.e. an eNB may either act as an MeNB or as an SeNB. In dual connectivity a UE can be connected to one MeNB and one SeNB. MeNB is the eNB which terminates at least S1-MME in dual connectivity, and SeNB is the eNB that is providing additional radio resources for the UE but is not the Master eNB in dual connectivity.

In addition, DC with CA configured means mode of operation of a UE in RRC_CONNECTED, configured with a Master Cell Group and a Secondary Cell Group. Here, "cell group" is a group of serving cells associated with either the Master eNB (MeNB) or the Secondary eNB (SeNB) in dual connectivity. "Master Cell Group (MCG)" is a group of serving cells associated with the MeNB, comprising of the primary cell (PCell) and optionally one or more secondary cells (SCells) in dual connectivity. "Secondary Cell Group (SCG)" is a group of serving cells associated with the SeNB comprising of primary SCell (pSCell) and optionally one or more SCells.

Here, the "cell" described herein should be distinguished from a 'cell' as a general region covered by a eNB. That is, cell means combination of downlink and optionally uplink resources. The linking between the carrier frequency (i.e. center frequency of the cell) of the downlink resources and the carrier frequency of the uplink resources is indicated in the system information transmitted on the downlink resources.

MCG bearer is radio protocols only located in the MeNB to use MeNB resources only in dual connectivity, and SCG bearer is radio protocols only located in the SeNB to use SeNB resources in dual connectivity. And, Split bearer is radio protocols located in both the MeNB and the SeNB to use both MeNB and SeNB resources in dual connectivity.

FIG. 8 illustrates Control Plane for Dual Connectivity in the wireless communication system to which the present invention can be applied.

Inter-eNB control plane signalling for dual connectivity can be performed by means of X2 interface signalling. Control plane signalling towards the MME is performed by means of S1 interface signalling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB can be performed by means of X2 interface signalling.

Referring to the FIG. 8, the MeNB is C-plane connected to the MME via S1-MME, the MeNB and the SeNB are interconnected via X2-C.

FIG. 9 illustrates User Plane architecture for Dual Connectivity in the wireless communication system to which the present invention can be applied.

U-plane connectivity depends on the bearer option configured as follow.

For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. Here, split bearer is radio protocols located in both the MeNB and the SeNB to use both MeNB and SeNB resources. For SCG bearers, the SeNB is directly connected with the S-GW via S1-U. Thus, if only MCG and split bearers are configured, there is no S1-U termination in the SeNB.

FIG. 10 illustrates architecture of radio interface protocol for Dual Connectivity between the E-UTRAN and a UE in the wireless communication system to which the present invention can be applied.

In Dual Connectivity, the radio protocol architecture that a particular bearer uses depends on how the bearer is setup. Three alternatives exist, MCG bearer, SCG bearer and split bearer. That is, some bearers (e.g., SCG bearers) of a UE may be served by the SeNB while others (e.g., MCG bearers) are only served by the MeNB. Also, some bearers (e.g., split bearers) of a UE may be split while others (e.g., MCG bearers) are only served by the MeNB. Those three alternatives are depicted on FIG. 10.

In case that MCG bearer and/or SCG bearer is setup, S1-U terminates the currently defined air-interface U-plane protocol stack completely per bearer at a given eNB, and is tailored to realize transmission of one EPS bearer by one node. The transmission of different bearers may still happen simultaneously from the MeNB and a SeNB In case that split bearer is setup, S1-U terminates in MeNB with the PDCP layer residing in the MeNB always. There is a separate and independent RLC bearer (SAP above RLC), also at UE side, per eNB configured to deliver PDCP PDUs of the PDCP bearer (SAP above PDCP), terminated at the MeNB. The PDCP layer provides PDCP PDU routing for transmission and PDCP PDU reordering for reception for split bearers in DC.

SRBs are always of the MCG bearer and therefore only use the radio resources provided by the MeNB. Here, DC can also be described as having at least one bearer configured to use radio resources provided by the SeNB.

FIG. 11 illustrates Control plane architecture for Dual Connectivity in the wireless communication system to which the present invention can be applied.

Each eNB should be able to handle UEs autonomously, i.e., provide the PCell to some UEs while acting as assisting eNB for other. It is assumed that there will be only one S1-MME Connection per UE.

In dual connectivity operation, the SeNB owns its radio resources and is primarily responsible for allocating radio resources of its cells. Thus, some coordination is still needed between MeNB and SeNB to enable this.

At least the following RRC functions are relevant when considering adding small cell layer to the UE for dual connectivity operation:
  Small cell layer's common radio resource configurations
  Small cell layer's dedicated radio resource configurations
  Measurement and mobility control for small cell layer
  In dual connectivity operation, a UE always stays in a single RRC state, i.e., either RRC_CONNECTED or RRC_IDLE.

Referring the FIG. 11, only the MeNB can generate the final RRC messages to be sent towards the UE after the coordination of RRM functions between MeNB and SeNB. The UE RRC entity sees all messages coming only from one entity (in the MeNB) and the UE only replies back to that entity. L2 transport of these messages depends on the chosen UP architecture and the intended solution.

The following general principles can be applied for the operation of dual connectivity.

1) The MeNB maintains the RRM measurement configuration of the UE and may, e.g., based on received measurement reports or traffic conditions or bearer types, decide to ask an SeNB to provide additional resources (serving cells) for a UE.

2) Upon receiving the request from the MeNB, an SeNB may create the container that will result in the configuration of additional serving cells for the UE (or decide that it has no resource available to do so).

3) The MeNB and the SeNB exchange information about UE configuration by means of RRC containers (inter-node messages) carried in Xn messages. Here, the Xn interface can be an X2 interface in LTE/LTE-A system.

4) The SeNB may initiate a reconfiguration of its existing serving cells (e.g., PUCCH towards the SeNB).

5) The MeNB may not change the content of the RRC configuration provided by the SeNB.

RRC Configuration for Small Cell in Dual Connectivity

As stated above, small cell architectures and operations are being discussed, especially focusing on dual connectivity of UEs to a macro cell (or MeNB) and a small cell (or SeNB). In the present invention, enhanced methods are shown for network operations considering UE's dual connectivity.

In Dual Connectivity, the configured set of serving cells for a UE consists of two subsets, the Master Cell Group (MCG) containing the serving cells of the MeNB, and the Secondary Cell Group (SCG) containing the serving cells of the SeNB.

With respect to the interaction between MeNB and SeNB, the following principles are applied.

The MeNB maintains the RRM measurement configuration of the UE. And the MeNB may, e.g., based on received measurement reports or traffic conditions or bearer types, decide to ask a SeNB to provide additional resources (serving cells) for a UE.

Upon receiving the request from the MeNB, a SeNB may create the container that will result in the configuration of additional serving cells for the UE (or decide that it has no resource available to do so).

For UE capability coordination, the MeNB provides (part of) the AS-configuration and the UE capability to the SeNB. The MeNB and the SeNB exchange information about UE configuration by means of RRC containers (inter-node messages) carried in Xn messages (e.g., X2 message).

The SeNB may initiate a reconfiguration of its existing serving cells (e.g., PUCCH towards the SeNB). The SeNB decides pSCell within the SCG. The MeNB does not change the content of the RRC configuration provided by the SeNB.

In the description, we assume that the SeNB provides the RRC configuration values in the small cell for the dual connection UE to the MeNB, and that the MeNB performs the RRC configuration or RRC reconfiguration procedure for the UE based on the RRC configuration values provided for the small cell side connection from the SeNB.

Hereinafter, it is assumed that eNB 1 is an MeNB and eNB 2 is an SeNB for the purposes of description. Thus, hereinafter, even without detailed description, an eNB 1 may be understood as an MeNB, and conversely, even without detailed description, an MeNB may be understood as an eNB 1. Similarly, even without a detailed description, an eNB may be understood as an SeNB, and conversely, even without a detailed description, an SeNB may be understood as an eNB 2.

However, application of the present invention is not limited thereto and the present invention may be applied in the same manner even when the eNB 1 is an SeNB and the eNB 2 is an MeNB. Also, the present invention may also be applied in the same manner even when both the eNB 1 and eNB 2 are MeNBs or SeNBs.

OFF-LOADING Procedure

The off-loading procedure is defined as the consecutive operation that UE served by an eNB makes a dual connection with the small cell operated by another eNB.

Opening a dual connection is the work to make additional paths from the eNB to UE via the small cell. At the same time, it is the procedure of the eNB to pass its traffic to the small cell as well. Therefore it has the characteristics of both the handover procedure and the E-RAB management procedure.

An off-loading procedure may be used to provide radio resource from an SeNB to a UE. That is, the off-loading procedure may refer to a procedure for adding a new SeNB to add an SCG bearer/split bearer, a small cell group (SCG), or one or more small cells. Also, even when dual connection has already been established in a macro cell or small cell, the off-loading procedure may refer to a procedure for adding an E-RAB (e.g., an SCG bearer or a split bearer) to be off-loaded to an SeNB or a procedure for newly adding a new SCG or one or more small cells.

In this case, an OFF-LOADING REQUEST message as described hereinafter may be used as a message for requesting addition of an SeNB, an SCG bearer/split bearer, an SCG, or one or more small cells. An OFF-LOADING REQUEST ACKNOWLEDGE may be used as a response message thereto.

In this case, message names may be different. For example, an OFF-LOADING REQUEST message may have a name of an SeNB ADDITION REQUEST or SCG ADDITION REQUEST message, and an OFF-LOADING REQUEST ACKNOWLEDGE message may have a name of an SeNB ADDITION REQUEST ACKNOWLEDGE message or an SCG ADDITION REQUEST ACKNOWLEDGE message.

FIG. 12 is a view illustrating an off-loading procedure for dual connection of a UE according to an embodiment of the present invention.

Referring to FIG. 12, a UE measures receive signal strength of a serving cell and neighbor cells and periodically reports the measurement strength, or when measurement values satisfy conditions given by a measurement configuration, a measurement event is triggered to transmit MEASUREMENT REPORT to an eNB (e.g., MeNB) (S1201).

Like a handover procedure, the eNB 1 may deliver a measurement configuration to the UE in order to inform the UE which measurement information is to be reported. The measurement configuration may be provided to the UE through an RRC Connection Reconfiguration message when the UE establishes an RRC connection with the eNB 1. The measurement configuration may include a measurement object, a reporting configuration, a measurement ID, quantity configuration, and a measurement gap.

The measurement object may include information regarding E-UTR cells that the UE should measure, a frequency channel number to be measured, a physical cell ID (PCI) of cells to be measured, a black list cell ID, an offset value of each cell, and the like. The reporting configuration indicates a condition under which the UE is to transmit MEASUREMENT REPORT, That is, a triggering event. The measurement ID indicates an ID for identifying a measurement object. The quantity configuration indicates values to be measured by the UE, and the measurement gap indicates a period at which the UE measures a neighbor cell.

When a small cell to be measured uses a carrier frequency identical to that of the macro cell (intra-frequency neighbor measurement), the UE may measure the small cell without a measurement gap, but if the small cell uses a different carrier frequency (inter-frequency neighbor measurement), a neighbor cell may be measured by adjusting synchronization with a frequency of a neighbor cell du ring a UL/DL idle period.

The eNB 1 determines whether the eNB 1 requests the eNB 2 (e.g., SeNB) to allocate radio resource to the UE, that is, whether traffic of the UE is to be off-loaded to the eNB 2, based on information (e.g., signal strength information of a neighbor cell, radio resource management (RRM) information of the UE, or the like) included in the MEASUREMENT REPORT message received from the UE (S1203). Also, the eNB 1 may determine a target eNB (That is, eNB 2) as to which SeNB it may perform off-loading based on neighbor cell list information managed by the eNB 1.

When the eNB 1 determines to perform off-loading to the eNB 2, the eNB 1 transmits an OFF-LOADING REQUEST message to the eNB 2 (S1205). Here, the OFF-LOADING REQUEST message may include UE context information, RRC context information, and the like, and details thereof will be described hereinbelow.

The eNB 1 may request the eNB 2 to allocate radio resource for adding a particular E-RAB (That is, SCG bearer) to the UE. In this case, in order to request addition of an SCG bearer, the eNB 1 may indicate E-RAB characteristics through an OFF-LOADING REQUEST message. Here, the E-RAB characteristics may include E-RAB parameters, transport network layer (TNL) address information, information related to eNB 1 radio resource, and UE capability.

Also, unlike the SCG bearer, in case of a split bearer, the eNB 1 may determine an amount of radio resource to be requested from the eNB 2 such that QoS of each E-RAB can be guaranteed by the sum of resource provided by the eNB 1 and the eNB 2 together. In this case, OFF-LOADING REQUEST message may indicate an amount of radio resource to be requested from the eNB 2.

Table 1 illustrates an OFF-LOADING REQUEST message according to an embodiment of the present invention.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |
| Macro eNB UE XnAP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| UE Context Information | | 1 | | | YES | reject |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 . . . <maxnoof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | Old eNB endpoint of the S1 transport bearer. For delivery of UL PDUs. | — | — |
| >>>Transport Layer Address | M | | 9.2.2.1 (3GPP TS 36.413) | | — | |
| >>>Correlation ID | O | | 9.2.1.80 (3GPP TS 36.413) | | YES | ignore |

TABLE 1-continued

| IE/Group Name | Presence | Range | IE type and reference | Semantics description | Criticality | Assigned Criticality |
|---|---|---|---|---|---|---|
| >>>Bearer Split | O | | ENUMERATED (split, not split, . . . ) | Indicate whether each bearer is split or not | | |
| >>>>Bearer Split Portion | O | | INTEGER (0 . . . 100, . . . ) | If split, the ratio of traffic imposed to the small cell among the total traffic of each bearer | | |
| >RRC Context | M | | OCTET STRING | Includes the RRC Handover Preparation Information message as defined in subclause 10.2.2 of TS 36.331 [9] | — | — |

Referring to Table 1, IE/Group Name represents a name of an information element (IE) or an IE group. "M" of the Presence field denotes an IE/IE group included in a message all the time as a mandatory IE, "O" denotes an IE/IE group that may be included in a message or may not included, as an optional IE, and "C" denotes an IE/IE group included in a message only when particular conditions are met, as a conditional IE. The Range field represents the number by which IEs/IE groups are repeated.

The IE type and reference field represents a type (for example, ENUMERATED, INTEGER, OCTET STRING, etc) of a corresponding IE, and when a range of values of the corresponding IE exists, the IE type and reference field represents the range of the values.

The Criticality field represents criticality information applied to an IE/IE group. The criticality information refers to information indicating how a receiving end is to operate when the receiving end cannot understand the entirety of a portion of an IE/IE group. "-" denotes that criticality information is not applied, and "YES" denotes that criticality information is applied. "GLOBAL" represents that an IE and corresponding IEs commonly have single criticality information. "EACH" represents that each of repeated IEs has unique criticality information. Assigned Criticality field represents actual criticality information.

An IE or IE group included in the OFF-LOADING REQUEST message will be described in detail.

Message Type IE uniquely identifies the message being sent.

The Macro eNB UE XnAP ID uniquely identifies an UE over the Xn interface within an eNB. The Macro eNB UE XnAP ID is allocated at the MeNB. Here, a macro eNB UE XnAP ID is described to indicate that it is an identifier allocated by an MeNB, but like a handover procedure, the MeNB may be considered as a source eNB (eNB 1 in case of FIG. 12), and thus, Old eNB UE XnAP ID may be used. Also, an Xn interface is merely illustrative and an X2 interface, an interface between existing eNBs, may also be used in the same manner. In this case, Macro eNB UE XnAP ID may be replaced with Old eNB UE X2AP ID.

The Cause IE indicates the reason for a particular event for the whole protocol. That is, it may include information regarding off-loading.

The Target Cell ID represents an identifier of the target cell, that is, eNB 2. As the Target Cell ID, UTRAN Cell Global Identifier (ECGI), a unique identifier for identifying a cell, may be used globally.

UE Context Information IE includes information required for a logical S1/X2 connection used for transmission and reception of a UE-related message and association between UEs or required for a UE in an active state. That is, the UE Context Information IE may include UE Security Capabilities, AS Security Information, UE Aggregate Maximum Bit Rate, Subscriber Profile ID for RAT/Frequency priority, E-RABs To Be Setup List, RRC Context information elements (IEs).

The UE Security Capabilities IE defines the supported algorithms for encryption and integrity protection in the UE.

The AS Security Information IE is used to generate the key material to be used for AS security with the UE.

The UE Aggregate Maximum Bit Rate is applicable for all Non-GBR bearers per UE which is defined for the Downlink and the Uplink direction and provided by the MME to the eNB.

The Subscriber Profile ID IE for RAT/Frequency Selection Priority is used to define camp priorities in Idle mode and to control inter-RAT/inter-frequency off-loading in Active mode.

The E-RABs To Be Setup List IE represents a list of E-RABs for requesting preparation at the target cell (That is, eNB 2), and each of the E-RABs may include E-RABs To Be Setup Item IE.

The E-RABs To Be Setup Item IE represents detailed information of each E-RAB. The E-RABs To Be Setup Item IE may include E-RAB ID, E-RAB Level QoS Parameters, DL Forwarding, UL GTP Tunnel Endpoint, Transport Layer Address, Correlation ID, and Bearer Split information elements (IEs).

The E-RAB ID IE uniquely identifies an E-RAB for a UE. The E-RAB Level QoS Parameters IE defines the QoS to be applied to an E-RAB and includes necessary QoS parameters. The DL Forwarding IE indicates that the E-RAB is proposed for forwarding of downlink packets. The UL GTP Tunnel Endpoint IE indicates to request data forwarding of uplink packets to be performed for that bearer. That is, this IE is Old eNB endpoint of the S1 transport bearer for delivery of UL PDUs.

The Transport Layer Address IE is an IP address. The Correlation ID IE is the GTP Tunnel Endpoint Identifier (TEID) or generic routing encapsulation (GRE) key to be used for the user plane transport between eNB and the local gateway (L-GW).

As stated above, the dual connectivity allows to split a bearer and to serve each split bearer at macro cell and small cell separately. Therefore it is required for the small cell to recognize the information about which bearers are allowed to split and how much traffic would be imposed to the small cell among the total traffic of each bearer.

To resolve the problems, the present invention proposes the Bearer Split IE and the Bearer Split Potion IE as Table 1 above. The Bearer Split IE indicates whether each E-RAB is split to the macro cell and the small cell or not. The Bearer Split Portion IE informs the ratio of traffic imposed (or allowed) to the small cell among the total traffic.

The present invention proposes that the RRC Context IE for UE capability coordination between MeNB and SeNB in Dual Connectivity is included in the OFF-LOADING REQUEST message as Table 1 above. Thus, the RRC Context IE can be used UE Capability Negotiation (or Cooperation) between MeNB (e.g., eNB 1) and SeNB (e.g., eNB 2) during off-loading preparation.

The RRC Context IE includes information about RRC configuration information (radio resource configuration) for the SeNB (i.e. eNB 2) to determine the RRC configuration during the off-loading procedure. More specifically, The RRC Context can contain the information about one of 1) current RRC configuration in the macro cell for the UE (before opening (or setting up) the dual connection), 2) future RRC configuration (i.e., RRC configuration result) in the macro cell for the UE or remained UE capability (after setting up the dual connection), or 3) recommended RRC configuration in the small cell for the UE (after setting up the dual connection).

Further, the RRC Context IE can include the RRC Handover Preparation Information message. For example, the RRC Context IE can includes one or more of information of local E-UTRAN context required by the target eNB, information of UE specific RRM information, information of the RRC protocol release applicable for the current UE configuration, or information of UE-supported E-UTRA Absolute Radio Frequency Channel Number (EARFCN) of the handover target E-UTRA cell, etc.

Referring back to FIG. 12, when the eNB 2 is available to allocate radio resource to the UE, the eNB 2 performs admission controlling based on the received OFF-LOADING REQUEST message (S1207).

Regarding to RRC configuration for small cell/SCG, the eNB 2 refers to RRC Context information included in the OFF-LOADING REQUEST message to decide the RRC configuration values (radio resource configuration) for the small cell without exceeding the UE capability and/or violating the RRC configuration policy of the eNB 2.

Also, the eNB 2 may configure a radio resource with reference to E-RAB QoS parameter information or Bearer Split/Bearer Split Portion information. In detail, when addition of an SCG bearer is requested by the eNB 1, the eNB 2 may allocate radio resource to the UE in consideration of received E-RAB QoS parameter information. Meanwhile, when addition of a split bearer is requested by the eNB 1, the eNB 2 may allocate radio resource to the UE according to a traffic ratio allowed (or imposed) for a small cell in consideration of Bearer Split Portion information as well as the received E-RAB QoS parameter information.

The eNB 2 configures a transport bearer for transmitting uplink/downlink traffic of the UE. The eNB 2 may reserve a C-RNTI, and when the UE is required to be synchronized with a small cell, the eNB 2 may reserve an RACH preamble.

After determining RRC configuration on a small cell, the eNB 2 transmits an OFF-LOADING REQUEST ACKNOWLEDGE message to the eNB 1 (S1209). That is, the eNB 2 transmits determined new (or reconfigured) radio resource configuration information to the eNB 1 through an OFF-LOADING REQUEST ACKNOWLEDGE message. Also, the OFF-LOADING REQUEST ACKNOWLEDGE message may include a transparent container to be transmitted to the UE as an RRC message.

Meanwhile, when the eNB 2 cannot allocate radio resource, the eNB 2 transmits an OFF-LOADING REQUEST NON-ACKNOWLEDGE message to the eNB 1 to stop the off-loading procedure. In the case of FIG. 12, it is assumed that the eNB 2 is available to allocate radio resource to the UE.

Table 2 illustrates an OFF-LOADING REQUEST ACKNOWLEDGE message according to an embodiment of the present invention.

TABLE 2

| IE/Group Name | Presence | Range | IE type and reference | Semantics description | Criticality | Assigned Criticality |
|---|---|---|---|---|---|---|
| Message Type | M | | 9.2.13 | | YES | reject |
| Macro eNB UE XnAP ID | M | | eNB UE X2AP ID 9.2.24 | Allocated at the source eNB | YES | ignore |

TABLE 2-continued

| IE/Group Name | Presence | Range | IE type and reference | Semantics description | Criticality | Assigned Criticality |
|---|---|---|---|---|---|---|
| Small Cell eNB UE XnAP ID | M | | eNB UE X2AP ID 9.2.24 | Allocated at the target eNB | YES | ignore |
| E-RABs Admitted List | | 1 | | | YES | ignore |
| > E-RABs Admitted Item | | 1 . . . <maxnoof Bearers> | | | EACH | ignore |
| >>E-RAB ID | M | | 9.2.23 | | — | — |
| >>UL GTP Tunnel Endpoint | O | | GTP Tunnel Endpoint 9.2.1 | Identifies the Xn transport bearer used for forwarding of UL PDUs | — | — |
| >>DL GTP Tunnel Endpoint | O | | GTP Tunnel Endpoint 9.2.1 | Identified the Xn transport bearer. used for forwarding of DL PDUs | — | — |
| >>Transport Layer Address | M | | 9.2.2.1 | | — | |
| >>Bearer Split Portion | O | | INTEGER (0 . . . 100, . . . ) | The ratio of traffic allowed to the small cell among the total traffic of each bearer | | |
| E-RABs Not Admitted List | O | | E-RAB List 9.2.28 | A value for E-RAB ID shall only be present once in E-RABs Admitted List IE and in E-RABs Not Admitted List IE. | YES | ignore |
| Target eNB To Source eNB Transparent Container | M | | OCTET STRING | Includes the RRC E-UTRA Handover Command message as defined in subclause 10.2.2 in TS 36.331 [9] | YES | ignore |

TABLE 2-continued

| IE/Group Name | Presence | Range | IE type and reference | Semantics description | Criticality | Assigned Criticality |
|---|---|---|---|---|---|---|
| RRC Context | M | | OCTET STRING | Includes the RRC Handover Preparation Information message as defined in subclause 10.2.2 of TS 36.331 [9] | — | — |
| Criticality Diagnostics | O | | 9.2.7 | | YES | ignore |

The fields enumerated in Table 2 are identical to the fields of Table 1, and thus, descriptions thereof will now be omitted.

Referring to FIG. 2, an IE or IE group included in an OFF-LOADING REQUEST ACKNOWLEDGE message will be described in detail.

Message Type IE uniquely identifies the message being sent.

The Macro eNB UE XnAP ID and the Small Cell eNB UE XnAP ID uniquely identify an UE over the Xn interface within an eNB. The Macro eNB UE XnAP ID is allocated at the MeNB. And, the Small Cell eNB UE XnAP ID is allocated at the SeNB. As stated above, Macro eNB UE XnAP ID may be replaced with Old eNB UE X2AP ID, and also, Small Cell eNB UE XnAP ID may be replaced with New eNB X2AP ID.

The E-RABs Admitted List IE represents a list of resource-prepared E-RABs, and each of the E-RAB may include E-RABs Admitted Item IE.

The E-RABs Admitted Item IE represents detailed information regarding each of the E-RABs. The E-RABs Admitted Item IE may include E-RAB ID, UL GTP Tunnel Endpoint, DL GTP Tunnel Endpoint, Transport Layer Address, and Bearer Split Portion information elements (IEs).

The E-RAB ID IE uniquely identifies an E-RAB for a UE. The UL GTP Tunnel Endpoint identifies the Xn transport bearer (e.g. X2 transport bearer) between source eNB (i.e. eNB 1) and target eNB (i.e. eNB 2) used for forwarding of UL PDUs. The DL GTP Tunnel Endpoint identifies the Xn transport bearer (e.g. X2 transport bearer) between source eNB (i.e. eNB 1) and target eNB (i.e. eNB 2) used for forwarding of DL PDUs.

The Transport Layer Address IE is an IP Address.

As stated above, the dual connectivity allows to split a bearer and to serve each split bearer at macro cell and small cell separately. Therefore it is required for the small cell to recognize the information about which bearers are allowed to split and how much traffic would be imposed to the small cell among the total traffic of each bearer.

To resolve the problems, the present invention proposes the Bearer Split Potion IE as Table 2 above. The Bearer Split Portion IE is the ratio of traffic allowed to the small cell among the total traffic of each bearer, provided that any E-RAB is split to the macro cell and the small cell.

The E-RABs Not Admitted List IE represents resource-unprepared E-RABs in the eNB 2. The E-RABs Not Admitted List IE is a value for E-RAB ID shall only be present once in E-RABs Admitted List IE and in E-RABs Not Admitted List IE.

The Target eNB To Source eNB Transparent Container IE is sent to the UE as an RRC message to perform the off-loading. The Container IE includes a new C-RNTI, target eNB (i.e. eNB 2) security algorithm identifiers for the selected security algorithms, may include a dedicated RACH preamble, and possibly some other parameters i.e. access parameters, system information blocks (SIBs), etc.

The Criticality Diagnostics IE is sent when parts of a received message have not been comprehended or were missing, or if the message contained logical errors. When applicable, it contains information about which IEs were not comprehended or were missing.

The present invention proposes that the RRC Context IE for UE capability coordination between MeNB and SeNB in Dual Connectivity is included in the OFF-LOADING REQUEST ACKNOWLEDGE message as Table 2 above.

The RRC Context can contain the information about RRC configuration values decided for the UE RRC connection in the small cell side.

Further, the RRC Context IE can include the RRC Handover Preparation Information message. For example, the RRC Context IE can includes one or more of information of local E-UTRAN context required by the target eNB, information of UE specific RRM information, information of the RRC protocol release applicable for the current UE configuration, or information of UE-supported EARFCN of the handover target E-UTRA cell, etc.

As described above, the RRC Context IE included in the OFF-LOADING REQUEST message may include any one of three information.

Hereinafter, in the present disclosure, an RRC MCG configuration refers to an RRC configuration in the macro cell for the UE. That is, the RRC MCG configuration refers to an RRC configuration configured by the eNB 1. Also, an RRC SCG configuration refers to an RRC configuration in the small cell for the UE. That is, the RRC SCG configuration refers to an RRC configuration configured by the eNB 2.

In detail, when the MeNB transmits an current RRC MCG configuration to the SeNB through an OFF-LOADING REQUEST message as in case 1), the SeNB may expect that the RRC MCG configuration is configured in the same manner as at present. Thus, the SeNB may compare the received current RRC MCG configuration with UE capability and configure an RRC SCG configuration without exceeding UE capability. Also, the SeNB may configure an RRC SCG configuration without violating the current RRC MCG configuration policy received from the MeNB. For example, in a case in which the UE supports 11 bearers to be configured, when the RRC configuration for 7 bearers are configured in the current RRC MCG configuration received from the eNB 1, the RRC configuration for 4 or less bearers may be configured in the RRC SCG configuration without exceeding the UE capability or violating the RRC configuration policy of the eNB 1. Also, for example, in a case in which the UE supports four layers for downlink spatial multiplexing, when two layers are configured in the current RRC MCG configuration received from the eNB 1, two or less layers may be configured in the RRC SCG configuration without exceeding UE capability or violating the RRC MCG configuration policy.

Then, the eNB 2 transmits the RRC SCG configuration configured as described above to the MeNB through an OFF-LOADING REQUEST ACKNOWEDGE message.

When future RRC MCG configuration (i.e., RRC configuration result in the macro cell) or remained UE capability is transmitted to the SeNB through an OFF-LOADING REQUEST message as in case 2), the SeNB may expect that the RRC MCG configuration is changed in the different manner as at present. That is, MeNB may provide the RRC configuration result of the MeNB served cell to SeNB to assist SeNB to decide the RRC Configuration for the SeNB served cell. Also, MeNB may inform the remained part of UE capability to SeNB after it determines the RRC configuration for the MeNB served cell. Thus, if the SeNB received the RRC configuration result of the MeNB served cell, the SeNB may compare the RRC MCG configuration of the MeNB served cell with UE capability and configure the RRC SCG configuration without exceeding the UE capability. Also, the SeNB may configure an RRC SCG configuration without violating the future RRC MCG configuration policy (i.e., the RRC configuration result of the MeNB served cell) received from the MeNB. Further, if the SeNB received the remained part of UE capability, SeNB may configure the RRC SCG configuration without the remained part of UE capability received from the MeNB.

Here, in a case in which dual connection has not been established within a macro cell and a small cell like the case of adding a new SeNB, the SeNB may configure an RRC configuration for a corresponding UE within the small cell according to the future RRC MCG configuration (i.e., the RRC configuration result of the MeNB served cell) received from the MeNB, not causing a problem.

However, in the case in which dual connection has already been established in the macro cell and the small cell, the current RRC MCG configuration and the future RRC MCG configuration configured in the MeNB may be modified, and thus, in this case, a problem related to UE capability may arise. For example, in a case in which the UE supports 11 bearers to be configured, the RRC configuration for 7 bearers are configured in the current RRC MCG configuration of the MeNB and the RRC configuration for 4 bearers are configured in the current RRC SCG configuration of the SeNB, but when the RRC configuration for 9 bearers is configured in the future RRC MCG configuration, a problem of exceeding the UE capability may arise. Also, for example, in a case in which the UE supports four layers for downlink spatial multiplexing, two layers are configured in the current RRC MCG configuration of the MeNB and two layers are configured in the RRC SCG configuration, but when three layers are configured in the future RRC MCG configuration, a problem of exceeding the UE capability may arise.

As a solution, although the combination of the future RRC MCG configuration received from the MeNB and the RRC SCG configuration configured in the current small cell exceeds the UE capability, the SeNB may reconfigure the RRC SCG configuration according to a changed future RRC MCG configuration. Thus, in the above example, in a case in which the RRC configuration for 9 bearers is configured in the future RRC MCG configuration received from the MeNB, the SeNB may configure the RRC configuration for 2 or less bearers in the RRC SCG configuration without exceeding the UE capability or violating the RRC MCG configuration policy. Also, in the above another example, in a case in which three layers are configured in the future RRC MCG configuration received from the MeNB, the SeNB may configure one layer in the RRC SCG configuration without exceeding the UE capability or violating the RRC MCG configuration policy.

Then, the eNB 2 transmits the RRC SCG configuration configured as described above to the MeNB through an OFF-LOADING REQUEST ACKNOWLEDGE message.

When recommended RRC SCG configuration is transmitted to the SeNB through the OFF-LOADING REQUEST message as in case 3), the SeNB may configure the RRC SCG configuration according to the received recommended RRC SCG configuration without exceeding the UE capability or violating the RRC MCG configuration policy.

Also, in this case, in a case in which dual connection has already been established in the macro cell and the small cell, the current RRC SCG configuration configured in the SeNB and the recommended RRC SCG configuration may be changed, and thus, in this case, a problem related to UE capability may arise. For example, in a case in which the UE supports 11 bearers to be configured, the RRC configuration for 7 bearers are configured in the current RRC MCG configuration of the MeNB and the RRC configuration for 4 bearers are configured in the current RRC SCG configuration of the SeNB, but when the RRC configuration for 6 bearers is configured in the future RRC SCG configuration, a problem of exceeding the UE capability may arise. Also, for example, in a case in which the UE supports four layers for downlink spatial multiplexing, two layers are configured in the current RRC MCG configuration of the MeNB and two layers are configured in the RRC SCG configuration, but when three layers are configured in the future RRC MCG configuration, it may exceed the UE capability.

As a solution, although the combination of the future RRC SCG configuration received from the MeNB and the RRC MCG configuration configured in the current macro cell exceeds the UE capability, the SeNB may reconfigure the RRC SCG configuration according to a changed future RRC SCG configuration. Thus, in the above example, in a case in which the RRC configuration for 6 bearers is configured in the future RRC SCG configuration received from the MeNB, the SeNB may configure the RRC configuration for 6 or less bearers in the RRC SCG configuration without exceeding the UE capability or violating the RRC MCG configuration policy. Also, in the above another example, in a case in which three layers are configured in the future RRC SCG configuration received from the MeNB, the SeNB may configure three or less layers in the RRC SCG configuration without exceeding UE capability or violating the RRC MCG configuration policy.

Then, the eNB 2 transmits the configured RRC SCG configuration to the MeNB through an OFF-LOADING REQUEST ACKNOWLEDGE message.

To sum up, MeNB can send a targeted RRC MCG configuration to the SeNB that exceeds the UE capability in combination with the current SCG configuration. In this case the SeNB shall respond with an RRC reconfiguration message containing an updated RRC SCG configuration that, together with the received targeted MCG configuration, stays within UE capability limits.

As described above, the SeNB should configure the RRC configuration without exceeding the UE capability or violating the RRC MCG configuration policy. Thus, the SeNB cannot send a targeted RRC SCG configuration to the MeNB that exceeds the UE capability in combination with the latest MCG configuration that it received from the MeNB.

Referring back to FIG. 12, upon receiving an OFF-LOADING REQUEST ACKNOWLEDGE message, the eNB 1 transmits an RRC Connection Reconfiguration message to the UE to apply a new RRC configuration to the UE (S1211). Here, the MeNB checks whether the RRC configuration values in the small cell side exceed the UE capability or violate the RRC configuration policy of the MeNB in consideration of the RRC configuration in the macro cell for the dual connection UE.

Here, although not shown in FIG. 12, the UE may perform a new RRC reconfiguration according to the RRC Connection Reconfiguration received from the eNB 1 and transmit an RRC Connection Reconfiguration Complete message to the eNB 1.

Thereafter, the eNB 1 performs data forwarding to the eNB 2 (S1213) and delivers packet data with respect to the UE to the eNB 2 (S1215). In case of FIG. 12, an example of transmitting an RRC Connection Reconfiguration message to the UE and performing data forwarding is illustrated, but the eNB 1 may receive an OFF-LOADING REQUEST ACKNOWLEDGE message from the eNB 2 and immediately perform data forwarding. Also, in a case in which the UE needs to be synchronized with a cell of the eNB 2, the UE may perform data forwarding after completing a synchronization procedure of the UE (e.g., random access procedure).

E-RAB MODIFICATION Procedure

As the E-RAB modification procedure for S1 interface, a dual connection needs means to modify its E-RAB (e.g., SCG bearer or split bearer) off-loaded to the small cell. That is, each eNB involved in Dual Connectivity may correct E-RAB off-loaded to a small cell in consideration of a load state.

However, the E-RAB Modification procedure described hereinafter is not limited to the procedure for modifying an E-RAB. That is, the E-RAB modification procedure described hereinafter may refer to a procedure for correcting one or more small cells in an SCG allocated by the SeNB. In this case, the E-RAB MODIFY REQUEST message described hereinafter may be used as a message for requesting changing of one or more small cells in an SCG, and the E-RAB MODIFY RESPONSE message may be used as a response message thereto.

In this case, names of messages may be different. For example, an E-RAB MODIFY REQUEST message may have a name such as an SeNB MODIFICATION REQUEST message, an SCG MODIFY REQUEST message, or the like, and SeNB MODIFY RESPONSE or E-RAB MODIFY RESPONSE message may have a name such as an SeNB MODIFICATION REQUEST ACKNOWLEDGE message or an SCG MODIFY RESPONSE message.

FIG. 13 is a view illustrating an E-RAB modification procedure for dual connection of a UE according to an embodiment of the present invention.

The E-RAB Modification procedure may have the two following options according to a subject that initiates a procedure.

In case of option 1, the MeNB initiates the E-RAB modification procedure, based on its E-RAB management policy considering the load status of the macro cell and the small cell. FIG. 13(*a*) illustrates an E-RAP Modification procedure initiated in the MeNB.

In case of option 2, the small cell initiates the E-RAB modification procedure, based on its load status. FIG. 13(*b*) illustrates an E-RAB modification procedure initiated in the SeNB.

The option 2 may be divided into two types of options as follows.

In case of option 2a, if the MeNB receives the E-RAB MODIFY REQUEST message, it allows the acceptable requests only. On the other hand, in case of option 2b, if the MeNB receives the E-RAB MODIFY REQUEST message, it should allow the all requests.

First, the option 1 will be described.

Referring to FIG. 13(*a*), the eNB 1(e.g., MeNB) transmits an E-RAB MODIFY REQUEST message to the eNB 2(e.g., SeNB) (S1301).

The eNB 1 may transmit an E-RAB MODIFY REQUEST message based on a load state of a macro cell and a small cell. For example, in a case in which a load of the macro cell is increased or when a load of the small cell is reduced, the eNB 1 may request adding of a new E-RAB in addition to an E-RAP off-loaded to the small cell. Conversely, when a load of the macro cell is reduced or when a load of the small cell is increased, the eNB 1 may request releasing of a portion of the E-RAB off-loaded to the small cell.

Table 3 illustrates an E-RAP MODIFY REQUEST message according to an embodiment of the present invention.

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Macro eNB UE XnAP ID | M | | 9.2.3.3 | | YES | reject |
| Small Cell eNB UE XnAP ID | M | | 9.2.3.4 | | YES | reject |
| UE Aggregate Maximum Bit Rate | O | | 9.2.1.20 | | YES | reject |
| E-RAB to be Modified List | | 1 | | | YES | reject |

TABLE 3-continued

| IE/Group Name | Presence | Range | IE type and reference | Semantics description | Criticality | Assigned Criticality |
|---|---|---|---|---|---|---|
| >E-RAB To Be Modified Item IEs | | 1 ... <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Bearer Split | O | | ENUMERATED (split, not split, ...) | Indicate whether each bearer is split or not | | |
| >>>Bearer Split Portion | O | | INTEGER (0 ... 100, ...) | If split, the ratio of traffic imposed to the small cell among the total traffic of each bearer | | |
| RRC Context | M | | OCTET STRING | Includes the RRC Handover Preparation Information message as defined in subclause 10.2.2 of TS 36.331 [9] | — | — |

The fields enumerated in Table 3 are the same as those of Table 1, so a description thereof will now be omitted.

Referring to Table 3, an IE or IE group included in the E-RAB MODIFY REQUEST message will be described in detail.

Message Type IE uniquely identifies the message being sent.

The Macro eNB UE XnAP ID and the Small Cell eNB UE XnAP ID uniquely identify an UE over the Xn interface within an eNB. The Macro eNB UE XnAP ID is allocated at the MeNB. And, the Small Cell eNB UE XnAP ID is allocated at the SeNB. As stated above, Macro eNB UE XnAP ID may be replaced with Old eNB UE X2AP ID, and Small Cell eNB UE XnAP ID may be replaced with New eNB X2AP ID.

The UE Aggregate Maximum Bit Rate is applicable for all Non-GBR bearers per UE which is defined for the Downlink and the Uplink direction and provided by the MME to the eNB.

E-RAB to be Modified List IE is a list of E-RABs for requesting modification and each E-RAB may include E-RABs To Be Modified Item IE.

E-RABs To Be Modified Item IE represents detailed information of each of the E-RAB. E-RABs To Be Modified Item IE may include an E-RAB ID, E-RAB Level QoS Parameters, Bearer Split, and Bearer Split Portion (IEs).

The E-RAB ID IE uniquely identifies an E-RAB for a UE. The E-RAB Level QoS Parameters IE defines the QoS to be applied to an E-RAB and includes necessary QoS parameters.

The Bearer Split IE indicates whether each E-RAB is split to the macro cell and the small cell or not. The Bearer Split Portion IE informs the ratio of traffic imposed (or allowed) to the small cell among the total traffic.

Because E-RAB modification generally requires the change of the required radio resource amount, the E-RAB modification procedure accompanies the information for RRC configuration change. Also, as described above, the E-RAB Modification procedure may refer to a procedure for modifying one or more small cells allocated in the SeNB, and thus, in this case, information for changing an RRC configuration may be transmitted.

Thus, the present invention proposes that the RRC Context IE for UE capability coordination between MeNB and SeNB in Dual Connectivity is included in the E-RAB MODIFY REQUEST message as Table 3 above. Thus, the RRC Context IE can be used UE Capability Negotiation (or Cooperation) between MeNB (e.g., eNB 1) and SeNB (e.g., eNB 2) during E-RAB Modification procedure.

The RRC Context IE includes information about RRC configuration information (radio resource configuration) for the SeNB (i.e. eNB 2) to determine the RRC configuration during the E-RAB Modification procedure. More specifically, The RRC Context can contain the information about one of 1) Current RRC configuration in the macro cell for the UE (before opening the dual connection), 2) Future RRC configuration (i.e., RRC configuration result) in the macro cell for the UE or remained UE capability (after setting up the dual connection), or 3) Recommended RRC configuration in the small cell for the UE (after setting up the dual connection).

Further, the RRC Context IE can include the RRC Handover Preparation Information message. For example, the RRC Context IE can includes one or more of information of local E-UTRAN context required by the target eNB, information of UE specific RRM information, information of the RRC protocol release applicable for the current UE configuration, or information of UE-supported E-UTRA Absolute Radio Frequency Channel Number (EARFCN) of the handover target E-UTRA cell, etc.

The eNB 2(e.g., SeNB) transmits an E-RAB MODIFY RESPONSE message to the eNB 1(e.g., MeNB) in response to the E-RAB MODIFY REQUEST message (S1303).

Here, the eNB 2 may transmit modified RRC configuration information to the eNB 1 through an E-RAB MODIFY RESPONSE message.

Regarding to RRC configuration for small cell/SCG, the eNB 2 refers to RRC Context information included in the E-RAB MODIFY REQUEST message to decide the RRC configuration values (radio resource configuration) for the small cell without exceeding the UE capability and/or violating the RRC configuration policy of the eNB 1.

Also, the eNB 2 may configure radio resource with reference to E-RAB QoS parameter information and Bearer Split/Bearer Split Portion information. In detail, when adding of an SCG bearer is requested by the eNB 1, the SeNB may allocate radio resource to the UE in consideration of the received E-RAB QoS parameter information. On the other hand, when adding of a split bearer is requested by the eNB 1, the SeNB may allocate radio resource to the UE according to a traffic ratio allowed (or imposed) for the small cell in consideration of bearer split portion information as well as received E-RAB QoS parameter information.

Table 4 illustrates an E-RAB MODIFY RESPONSE message according to an embodiment of the present invention.

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Macro eNB UE XnAP ID | M | | 9.2.3.3 | | YES | ignore |
| Small Cell eNB UE XnAP ID | M | | 9.2.3.4 | | YES | ignore |
| E-RAB Modify List | | 0 . . . 1 | | | YES | ignore |
| >E-RAB Modify Item IEs | | 1 . . . <maxnoofE-RABs> | | | EACH | ignore |
| >>E-RAB ID | M | | 9.2.1.2 | | — | |
| E-RAB Failed to Modify List | O | | E-RAB List 9.2.1.36 | A value for E-RAB ID shall only be present once in E-RAB Modify List IE + E-RAB Failed to Modify List IE. | YES | ignore |
| RRC Context | M | | OCTET STRING | Includes the RRC Handover Preparation Information message as defined in subclause 10.2.2 of TS 36.331 [9] | — | — |
| Criticality Diagnostics | O | | 9.2.1.21 | | YES | ignore |

The fields enumerated in Table 4 are the same as those of Table 1 above, and thus, a description thereof will be omitted.

Referring to Table 4, an IE or IE group included in the E-RAB MODIFY RESPONSE message will now be described in detail.

The Message Type IE uniquely identifies the message being sent.

The Macro eNB UE XnAP ID and the Small Cell eNB UE XnAP ID uniquely identify an UE over the Xn interface within an eNB. The Macro eNB UE XnAP ID is allocated at the MeNB. And, the Small Cell eNB UE XnAP ID is allocated at the SeNB. As stated above, Macro eNB UE XnAP ID may be replaced with Old eNB UE X2AP ID, and Small Cell eNB UE XnAP ID may be replaced with New eNB X2AP ID.

The E-RAB Modify List IE represents a list of modified E-RAB, and each E-RAB may include an E-RAB Modify Item IE.

The E-RAB Modify Item IE represents detailed information regarding each of the E-RABs and includes an E-RAB ID. The E-RAB ID IE uniquely identifies an E-RAB for a UE.

The E-RAB Failed to Modify List IE presents a list of E-RABs which has failed to be modified. The E-RAB Failed to Modify List IE indicates a value for E-RAB ID shall only be present once in E-RAB Modify List IE+E-RAB Failed to Modify List IE.

The Criticality Diagnostics IE is sent when parts of a received message have not been comprehended or were missing, or if the message contained logical errors. When applicable, it contains information about which IEs were not comprehended or were missing.

The present invention proposes that the RRC Context IE for UE capability coordination between MeNB and SeNB in Dual Connectivity is included in the E-RAB MODIFY RESPONSE message as Table 4 above.

The RRC Context can contain the information about RRC configuration values decided for the UE RRC connection in the small cell side.

Further, the RRC Context IE can include the RRC Handover Preparation Information message. For example, the RRC Context IE can includes one or more of information of local E-UTRAN context required by the target eNB, information of UE specific RRM information, information of the RRC protocol release applicable for the current UE configuration, or information of UE-supported EARFCN of the handover target E-UTRA cell, etc.

As described above, an RRC Context IE included in the E-RAB MODIFY request message may include any one of the three types of information described above.

In detail, in case of transmitting an current RRC MCG configuration to the SeNB through an E-RAB MODIFY REQUEST message as in case 1), the SeNB may configure an RRC SCG configuration without exceeding UE capability. Also, the SeNB may configure an RRC SCG configuration without violating the current RRC MCG configuration policy received from the MeNB. For example, in a case in which the UE supports 11 bearers to be configured, when the RRC configuration for 7 bearers are configured in the current RRC MCG configuration received from the eNB 1, the RRC configuration for 4 or less bearers may be configured in the RRC SCG configuration without exceeding the UE capability or violating the RRC configuration policy of the eNB 1. For example, in a case in which the UE supports four layers for downlink spatial multiplexing, when two layers are configured in the current RRC MCG configuration received from the eNB 1, two or less layers may be configured in the RRC SCG configuration without exceeding UE capability or violating the RRC MCG configuration policy.

Then, the eNB 2 transmits the RRC SCG configuration configured as described above to the MeNB through an E-RAB MODIFY RESPONSE message.

Future RRC MCG configuration (i.e., RRC configuration result in the macro cell) or remained UE capability may be transmitted to the SeNB through an E-RAB MODIFY REQUEST message as in case 2). That is, MeNB may provide the RRC configuration result of the MeNB served cell to SeNB to assist SeNB to decide the RRC Configuration for the SeNB served cell. Also, MeNB may inform the remained part of UE capability to SeNB after it determines the RRC configuration for the MeNB served cell. Thus, the SeNB may configure the RRC SCG configuration without exceeding the UE capability. Also, if the SeNB received the RRC configuration result of the MeNB served cell, the SeNB may configure an RRC SCG configuration without violating a future RRC MCG configuration (i.e., the RRC configuration result of the MeNB served cell) received from the MeNB.

Here, the current RRC MCG configuration and the future RRC MCG configuration (i.e., the RRC configuration result of the MeNB served cell) configured in the MeNB may be modified, and thus, in this case, a problem related to UE capability may arise. For example, in a case in which the UE supports 11 bearers to be configured, the RRC configuration for 7 bearers are configured in the current RRC MCG configuration of the MeNB and the RRC configuration for 4 bearers are configured in the current RRC SCG configuration of the SeNB, but when the RRC configuration for 9 bearers is configured in the future RRC MCG configuration, a problem of exceeding the UE capability may arise. Also, for example, in a case in which the UE supports four layers for downlink spatial multiplexing, two layers are configured in the current RRC MCG configuration of the MeNB and two layers are configured in the RRC SCG configuration, but when three layers are configured in the future RRC MCG configuration, a problem of exceeding the UE capability may arise.

As a solution, although the combination of the future RRC MCG configuration received from the MeNB and the RRC SCG configuration configured in the current small cell exceeds the UE capability, the SeNB may reconfigure the RRC SCG configuration according to a changed future RRC MCG configuration. Thus, in the above example, in a case in which the RRC configuration for 9 bearers is configured in the future RRC MCG configuration received from the MeNB, the SeNB may configure the RRC configuration for 2 or less bearers in the RRC SCG configuration without exceeding the UE capability or violating the RRC MCG configuration policy. Also, in the above another example, in a case in which three layers are configured in the future RRC MCG configuration received from the MeNB, the SeNB may configure one layer in the RRC SCG configuration without exceeding the UE capability or violating the RRC MCG configuration policy.

Then, the eNB 2 transmits the configured RRC SCG configuration to the MeNB through an E-RAB MODIFY RESPONSE message.

In a case in which the MeNB transmits the recommended RRC SCG configuration to the SeNB through the E-RAB MODIFY REQUEST message as in case 3), the SeNB may configure the received recommended RRC SCG configuration without exceeding the UE capability or violating the RRC MCG configuration policy.

Also, in this case, the current RRC SCG configuration configured in the SeNB and the recommended RRC SCG configuration may be changed, and thus, in this case, a problem related to UE capability may arise. For example, in a case in which the UE supports 11 bearers to be configured, the RRC configuration for 7 bearers are configured in the current RRC MCG configuration of the MeNB and the RRC configuration for 4 bearers are configured in the current RRC SCG configuration of the SeNB, but when the RRC configuration for 6 bearers is configured in the future RRC SCG configuration, a problem of exceeding the UE capability may arise. Also, for example, in a case in which the UE supports four layers for downlink spatial multiplexing, two layers are configured in the current RRC MCG configuration of the MeNB and two layers are configured in the RRC SCG configuration, but when three layers are configured in the future RRC MCG configuration, it may exceed the UE capability.

As a solution, although the combination of the future RRC SCG configuration received from the MeNB and the RRC MCG configuration configured in the current macro cell exceeds the UE capability, the SeNB may reconfigure the RRC SCG configuration according to a changed future RRC SCG configuration. Thus, in the above example, in a case in which the RRC configuration for 6 bearers is configured in the future RRC SCG configuration received from the MeNB, the SeNB may configure the RRC configuration for 6 or less bearers in the RRC SCG configuration without exceeding the UE capability or violating the RRC MCG configuration policy. Also, in the above another example, in a case in which three layers are configured in the future RRC SCG configuration received from the MeNB, the SeNB may configure three or less layers in the RRC SCG configuration without exceeding UE capability or violating the RRC MCG configuration policy.

Then, the eNB 2 transmits the configured RRC SCG configuration to the MeNB through an E-RAB MODIFY RESPONSE message.

To sum up, MeNB can send a targeted RRC MCG configuration to the SeNB that exceeds the UE capability in combination with the current SCG configuration. In this case the SeNB shall respond with an RRC reconfiguration message containing an updated RRC SCG configuration that, together with the received targeted MCG configuration, stays within UE capability limits.

As described above, the SeNB should configure the RRC configuration without exceeding the UE capability or violating the RRC MCG configuration policy. Thus, the SeNB cannot send a targeted RRC SCG configuration to the MeNB that exceeds the UE capability in combination with the latest MCG configuration that it received from the MeNB.

Then, the MeNB checks whether the RRC configuration values in the small cell side exceed the UE capability or violate the RRC configuration policy of the MeNB in consideration of the RRC configuration in the macro cell for the dual connection UE.

Option 2 will be Described.

Referring to FIG. 13(b), eNB 2(e.g., SeNB) transmits an E-RAB MODIFY REQUEST message to the eNB 1(e.g., MeNB) (S1305).

The eNB 2 may transmit an E-RAB MODIFY REQUEST message based on a load state of a macro cell and a small cell. For example, in a case in which a load of the macro cell is increased or when a load of the small cell is reduced, the eNB 2 may request adding of a new E-RAB in addition to an E-RAP off-loaded to the small cell. Conversely, when a load of the macro cell is reduced or when a load of the small cell is increased, the eNB 2 may request releasing of a portion of the E-RAB off-loaded to the small cell.

Here, the E-RAB MODIFY REQUEST message is identical to that of Table 3, and thus, a detailed description thereof will be omitted. However, information included in the RRC Context IE may be different, which will now be described.

As stated above, because E-RAB modification generally requires the change of the required radio resource amount, the E-RAB modification procedure accompanies the information for RRC configuration change. Also, the E-RAB Modification procedure may refer to a procedure for modifying or correcting a small cell group (SCG) or one or more small cells allocated from the SeNB, and thus, in this case, information for modifying the RRC configuration may be transmitted.

The RRC Context IE includes information about RRC configuration values decided for the UE connection in the small cell side.

Further, the RRC Context IE can include the RRC Handover Preparation Information message. For example, the RRC Context IE can includes one or more of information of local E-UTRAN context required by the target eNB, information of UE specific RRM information, information of the RRC protocol release applicable for the current UE configuration, or information of UE-supported E-UTRA Absolute Radio Frequency Channel Number (EARFCN) of the handover target E-UTRA cell, etc.

As a response to the E-RAB MODIFY REQUEST message, the eNB 1(e.g., MeNB) transmits an E-RAB MODIFY RESPONSE message to the eNB 2(e.g., SeNB) (S1307).

First, in case of option 2a, the E-RAB MODIFY RESPONSE message is the same as that of Table 4 described above, so a detailed description thereof will be omitted. However, information included in the RRC Context IE may be different, which will now be described.

The RRC Context IE includes information about indication whether the received RRC configuration values are available in the MeNB (i.e. eNB 1) point of view.

The MeNB (i.e. eNB 1) checks whether the RRC configuration values in the small cell side exceed the UE capability or violate the RRC configuration policy of the MeNB in consideration of the RRC configuration in the macro cell for the dual connection UE.

When the RRC configuration received through the E-RAB MODIFY REQUEST message from the eNB 2 does not exceed UE capability and not violate an RRC configuration policy of eNB 1, the eNB 1 approves the received RRC configuration information. Then, the eNB 1 may transmit an RRC MCG configuration modified in consideration of the received RRC configuration information to the eNB 2 through an E-RAB MODIFY RESPONSE message.

On the other hand, when the RRC configuration received through the E-RAB MODIFY REQUEST message from the eNB 2 exceeds UE capability or violates the RRC configuration policy of the eNB 1, the eNB 1 does not approve the received RRC configuration information. Then, the eNB 1 may transmit information indicating that the received RRC configuration information is not approved, to the eNB 2 through an E-RAB MODIFY RESPONSE message.

Also, If possible, the RRC Context included in the E-RAB MODIFY RESPONSE message can contain the information about one of 1) Current RRC configuration in the macro cell for the UE (before opening the dual connection), 2) Future RRC configuration in the macro cell for the UE (after setting up the dual connection), or 3) Recommended RRC configuration in the small cell for the UE (after setting up the dual connection).

Then, if the SeNB receive the information above, it refers to this information to decide the RRC configuration values for the small cell without exceeding the UE capability or violating the RRC configuration policy of the MeNB. That is, a process of configuring an RRC configuration between the eNB 1 and the eNB 2 may be performed in the same manner as that of the E-RAB MODIFICATION procedure initiated by the eNB 1 described above with reference to FIG. 13(a).

Meanwhile, in case of option 2b, an E-RAB MODIFY RESPONSE message may be configured as shown in Table 5 below.

Table 5 illustrates an E-RAB MODIFY RESPONSE message according to an embodiment of the present invention.

E-RAB RELEASE Procedure

As the E-RAB release procedure for S1 interface, a dual connection needs means to release its E-RAB (e.g., SCG bearer or split bearer) off-loaded to the small cell. That is, each eNB involved in Dual Connectivity may release an E-RAB off-loaded to the small cell in consideration of a load state.

However, the E-RAB Release procedure described hereinafter is not limited to the procedure of releasing the E-RAB. That is, the E-RAB Release procedure described hereinafter may refer to a procedure for releasing an SCG allocated by the SeNB. In this case, an E-RAB RELEASE REQUEST message described hereinafter may be used as a message for requesting releasing of an SCG and an E-RAB RELEASE RESPONSE may be used as a response message thereto.

In this case, a name of a message may be different therefrom. For example, the E-RAB RELEASE REQUEST

TABLE 5

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Macro eNB UE XnAP ID | M | | 9.2.3.3 | | YES | ignore |
| Small Cell eNB UE XnAP ID | M | | 9.2.3.4 | | YES | ignore |
| E-RAB Modify List | | 0 . . . 1 | | | YES | ignore |
| >E-RAB Modify Item IEs | | 1 . . . <maxnoofE-RABs> | | | EACH | ignore |
| >>E-RAB ID | M | | 9.2.1.2 | | — | — |
| RRC Context | M | | OCTET STRING | Includes the RRC Handover Preparation Information message as defined in subclause 10.2.2 of TS 36.331 [9] | — | — |
| Criticality Diagnostics | O | | 9.2.1.21 | | YES | ignore |

The fields enumerated in Table 5 are the same as those of Table 1 described above, and thus, a description thereof will be omitted.

In case of option 2b compared to option 2a described above, a procedure thereof is identical to that of option 2a, except that E-RAB MODIFY RESPONSE does not include an E-RAB Failed to Modify List IE. That is, since the E-RAB MODIFY RESPONSE message does not include an E-RAB Failed to Modify List IE, eNB 1 accepts an E-RAB modify request from the eNB 2, and in this sense, option 2b is different from option 2a.

However, although modification of E-RAB from the eNB 2 is accepted, like the option 2a the eNB 1 may determine whether the RRC context received through the E-RAB MODIFY REQUEST message satisfies UE capability or whether it satisfies the RRC configuration policy of the eNB 1 and transmit corresponding results (for example, RRC configuration information) to the eNB 2 s of the RRC configuration are identical to those of option 2a, and thus, a detailed description thereof will be omitted.

message may have a name such as an SeNB RELEASE REQUEST message, an SCG RELEASE REQUEST message, or the like, and the E-RAB RELEASE RESPONSE message may have a name such as an SeNB RELEASE CONFIRM message, an SCG RELEASE RESPONSE message, or the like.

FIG. 14 is a view illustrating an E-RAB release procedure of a UE according to an embodiment of the present invention.

The E-RAB Release procedure may have two types of option as follows according to a subject that initiates a procedure.

In case of option 1, the MeNB initiates the E-RAB release procedure, based on its E-RAB release policy considering the load status of the macro cell and the small cell. FIG. 14(a) illustrates an E-RAB Release procedure initiated by the MeNB.

In case of option 2, the small cell initiates the E-RAB release procedure, based on its load status. FIG. 14(b) illustrates an E-RAB Release procedure initiated by the SeNB.

Option 2 may also be divided into two types of option as follows.

In case of option 2a, if the MeNB receives the E-RAB RELEASE REQUEST message, it allows the acceptable requests only. Meanwhile, in case of option 2b, if the MeNB receives the E-RAB RELEASE REQUEST message, it should allow the all requests.

First, Option 1 will be Described.

Referring to FIG. 14(a), in order to release one or more E-RABs configured in the eNB 2, the eNB 1 transmits an E-RAB RELEASE REQUEST message to the eNB 2 (e.g., SeNB) (S1401).

The eNB 1 may transmit E-RAB RELEASE REQUEST message based on load states of the macro cell and the small cell. For example, when a load of the macro cell is reduced or when a load of the small cell is increased, the eNB 1 may request releasing of the E-RAB off-loaded to the small cell.

Table 6 illustrates an E-RAB RELEASE REQUEST message according to an embodiment of the present invention.

XnAP ID may be replaced with Old eNB UE X2AP ID, and also, Small Cell eNB UE XnAP ID may be substituted with New eNB X2AP ID.

The UE Aggregate Maximum Bit Rate is applicable for all Non-GBR bearers per UE which is defined for the Downlink and the Uplink direction and provided by the MME to the eNB.

The E-RAB To Be Released List IE is a list of E-RABs requested to be released.

The present invention proposes that the RRC Context IE for UE capability coordination between MeNB and SeNB in Dual Connectivity is included in the E-RAB RELEASE REQUEST message as table 6 above. Thus, the RRC Context IE can be used UE Capability Negotiation (or Cooperation) between MeNB (e.g., eNB 1) and SeNB (e.g., eNB 2) during E-RAB Release procedure.

The RRC Context IE includes information about RRC configuration values decided for the UE connection in the macro cell side.

Further, the RRC Context IE can include the RRC Handover Preparation Information message. For example, the

TABLE 6

| IE/Group Name | Presence | Range | IE type and reference | Semantics description | Criticality | Assigned Criticality |
| --- | --- | --- | --- | --- | --- | --- |
| Message Type | M | | 9.2.1.1 | | YES | reject |
| Macro eNB UE XnAP ID | M | | 9.2.3.3 | | YES | reject |
| Small Cell eNB UE XnAP ID | M | | 9.2.3.4 | | YES | reject |
| UE Aggregate Maximum Bit Rate | O | | 9.2.1.20 | | YES | reject |
| E-RAB To Be Released List | M | | E-RAB List 9.2.1.36 | A value for E-RAB ID shall only be present once in E-RAB To Be Released List IE. | YES | ignore |
| RRC Context | M | | OCTET STRING | Includes the RRC Handover Preparation Information message as defined in subclause 10.2.2 of TS 36.331 [9] | — | — |

The fields enumerated in Table 6 are the same as those of Table 1, so a description thereof will be omitted.

Referring to Table 6, an IE or IE group included in the E-RAB RELEASE REQUEST message will now be described in detail.

Message Type IE uniquely identifies the message being sent.

The Macro eNB UE XnAP ID and the Small Cell eNB UE XnAP ID uniquely identify an UE over the Xn interface within an eNB. The Macro eNB UE XnAP ID is allocated at the MeNB. And, the Small Cell eNB UE XnAP ID is allocated at the SeNB. As stated above, Macro eNB UE RRC Context IE can includes one or more of information of local E-UTRAN context required by the target eNB, information of UE specific RRM information, information of the RRC protocol release applicable for the current UE configuration, or information of UE-supported E-UTRA Absolute Radio Frequency Channel Number (EARFCN) of the handover target E-UTRA cell, etc.

The eNB 2 (e.g., SeNB) releases E-RABs requested to be released in the E-RAB RELEASE REQUEST message, and in order to inform the eNB 1 about the release results regarding the E-RABs requested to be released, the eNB 2 transmits an E-RAB RELEASE RESPONSE message to the eNB 1 (e.g., MeNB) (S1403).

Here, the eNB 2 may transmit modified RRC configuration information to the eNB 1 through an E-RAB RELEASE RESPONSE message.

Regarding to RRC configuration for small cell/SCG, the eNB 2 refers to RRC Context information included in the E-RAB RELEASE REQUEST message to decide the RRC configuration values (radio resource configuration) for the small cell without exceeding the UE capability and/or violating the RRC configuration policy of the eNB 1.

Table 7 illustrates an E-RAB RELEASE RESPONSE message according to an embodiment of the present invention.

XnAP ID may be replaced with Old eNB UE X2AP ID, and Small Cell eNB UE XnAP ID may be replaced with New eNB X2AP ID.

The E-RAB Release List IE represents a list of successfully released E-RABs, and each E-RAB may include E-RAB Release Item IE.

The E-RAB Release Item IE represents detailed information of each E-RAB and includes an E-RAB ID. The E-RAB ID IE uniquely identifies an E-RAB for a UE.

The E-RAB Failed to Release List IE represents a list of release-failed E-RABs. The E-RAB Failed to Release List

TABLE 7

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Macro eNB UE XnAP ID | M | | 9.2.3.3 | | YES | ignore |
| Small Cell eNB UE XnAP ID | M | | 9.2.3.4 | | YES | ignore |
| E-RAB Release List | | 0 . . . 1 | | | YES | ignore |
| >E-RAB Release Item IEs | | 1 . . . <maxnoofE-RABs> | | | EACH | ignore |
| >>E-RAB ID | M | | 9.2.1.2 | | — | |
| E-RAB Failed to Release List | O | | E-RAB List 9.2.1.36 | A value for E-RAB ID shall only be present once in E-RAB Release List IE + E-RAB Failed to Release List IE. | YES | ignore |
| RRC Context | M | | OCTET STRING | Includes the RRC Handover Preparation Information message as defined in subclause 10.2.2 of TS 36.331 [9] | — | — |
| Criticality Diagnostics | O | | 9.2.1.21 | | YES | ignore |

The fields enumerated in Table 7 are the same as those of Table 1, so a description thereof will be omitted.

Referring to Table 7, an IE or IE group included in the E-RAB RELEASE RESPONSE message will now be described in detail.

The Message Type IE Uniquely Identifies the Message being Sent.

The Macro eNB UE XnAP ID and the Small Cell eNB UE XnAP ID uniquely identify an UE over the Xn interface within an eNB. The Macro eNB UE XnAP ID is allocated at the MeNB. And, the Small Cell eNB UE XnAP ID is allocated at the SeNB. As stated above, Macro eNB UE IE indicates A value for E-RAB ID shall only be present once in E-RAB Release List IE+E-RAB Failed to Release List IE.

The Criticality Diagnostics IE is sent when parts of a received message have not been comprehended or were missing, or if the message contained logical errors. When applicable, it contains information about which IEs were not comprehended or were missing.

The present invention proposes that the RRC Context IE for UE capability coordination between MeNB and SeNB in Dual Connectivity is included in the E-RAB RELEASE RESPONSE message as table 7 above.

The RRC Context can contain the information about RRC configuration values decided for the UE RRC connection in the small cell side. That is, in order to allocate radio resource with respect to the release-failed E-RABs to the UE, the eNB 2 may transmit information regarding RRC configuration to the eNB 1 through the RRC Context.

Further, the RRC Context IE can include the RRC Handover Preparation Information message. For example, the RRC Context IE can includes one or more of information of local E-UTRAN context required by the target eNB, information of UE specific RRM information, information of the RRC protocol release applicable for the current UE configuration, or information of UE-supported EARFCN of the handover target E-UTRA cell, etc.

As described above, the RRC Context IE included it the E-RAB RELEASE REQUEST message may include RRC MCG configuration information configured in the macro cell (i.e., RRC configuration result in the macro cell) or remained UE capability. Here, since the E-RAB configured in the small cell is requested to be released, the RRC MCG configuration configured in the macro cell may be problematic in relation to UE capability. For example, in a case in which the UE supports 11 bearers to be configured, the RRC configuration for 7 bearers are configured in the current RRC MCG configuration of the MeNB and the RRC configuration for 4 bearers are configured in the current RRC SCG configuration of the SeNB, but when the RRC configuration for 9 bearers is configured in the future RRC MCG configuration, a problem of exceeding the UE capability may arise. Also, for example, in a case in which the UE supports four layers for downlink spatial multiplexing, two layers are configured in the current RRC MCG configuration of the MeNB and two layers are configured in the RRC SCG configuration, but when three layers are configured in the RRC MCG configuration (That is, received through the E-RAB RELEASE REQUEST message), a problem of exceeding the UE capability may arise. That is, when releasing the E-RAB configured in the small cell fails, it may exceed the UE capability.

As a solution, although the combination of the RRC MCG configuration received from the MeNB and the RRC SCG configuration configured in the current small cell exceeds the UE capability, the SeNB may reconfigure the RRC SCG configuration according to a received RRC MCG configuration. Thus, in the above example, in a case in which the RRC configuration for 9 bearers is configured in the future RRC MCG configuration received from the MeNB, the SeNB may configure the RRC configuration for 2 or less bearers in the RRC SCG configuration without exceeding the UE capability or violating the RRC MCG configuration policy. Also, in the above another example, in a case in which three layers are configured in the RRC MCG configuration received from the MeNB, the SeNB may configure one layer in the RRC SCG configuration without exceeding the UE capability or violating the RRC MCG configuration policy.

Then, the eNB 2 transmits the configured RRC SCG configuration to the MeNB through an E-RAB RELEASE RESPONSE message.

To sum up, MeNB can send a targeted RRC MCG configuration to the SeNB that exceeds the UE capability in combination with the current SCG configuration. In this case the SeNB shall respond with an RRC reconfiguration message containing an updated RRC SCG configuration that, together with the received targeted MCG configuration, stays within UE capability limits.

As described above, the SeNB should configure the RRC configuration without exceeding the UE capability or violating the RRC MCG configuration policy. Thus, the SeNB cannot send a targeted RRC SCG configuration to the MeNB that exceeds the UE capability in combination with the latest MCG configuration that it received from the MeNB.

Then, the MeNB checks whether the RRC configuration values in the small cell side exceed the UE capability or violate the RRC configuration policy of the MeNB in consideration of the RRC configuration in the macro cell for the dual connection UE.

The eNB 2(e.g., SeNB) transmits an E-RAB RELEASE INDICATION message including information regarding one or more released E-RABs to the eNB 1(e.g., MeNB) (S1405).

Upon receiving the E-RAB RELEASE INDICATION message, the eNB 1 performs a releasing procedure on the E-RABs identified in the E-RAB RELEASE INDICATION message in the core network.

Table 8 illustrates an E-RAB RELEASE INDICATION message according to an embodiment of the present invention.

TABLE 8

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Macro eNB UE XnAP ID | M | | 9.2.3.3 | | YES | reject |
| Small Cell eNB UE XnAP ID | M | | 9.2.3.4 | | YES | reject |
| E-RAB Released List | M | | E-RAB List 9.2.1.36 | A value for E-RAB ID shall only be present once in E-RAB Released List IE. | YES | ignore |
| RRC Context | M | | OCTET STRING | Includes the RRC Handover Preparation Information message | — | — |

TABLE 8-continued

| IE/Group Name | Presence | Range | IE type and reference | Semantics description | Criticality | Assigned Criticality |
|---|---|---|---|---|---|---|
| | | | as defined in subclause 10.2.2 of TS 36.331 [9] | | | |

The fields enumerated in Table 8 are the same as those of Table 1, so a description thereof will now be omitted.

Referring to Table 8, an IE or IE group included in the E-RAB RELEASE INDICATION message will be described in detail.

The Message Type IE uniquely identifies the message being sent.

The Macro eNB UE XnAP ID and the Small Cell eNB UE XnAP ID uniquely identify an UE over the Xn interface within an eNB. The Macro eNB UE XnAP ID is allocated at the MeNB. And, the Small Cell eNB UE XnAP ID is allocated at the SeNB. As stated above, Macro eNB UE XnAP ID may be replaced with Old eNB UE X2AP ID, and Small Cell eNB UE XnAP ID may be replaced with New eNB X2AP ID.

The E-RAB Released List IE Represents a List of Released E-RABs.

The present invention proposes that the RRC Context IE for UE capability coordination between MeNB and SeNB in Dual Connectivity is included in the E-RAB RELEASE INDICATION message as table 8 above.

The RRC Context can contain the information about RRC configuration values decided for the UE RRC connection in the small cell side. As described above, the MeNB checks whether the RRC configuration values in the E-RAB RELEASE RESPONSE message exceed the UE capability or violate the RRC configuration policy of the MeNB in consideration of the RRC configuration in the macro cell for the dual connection UE. Thus, the RRC configuration values included in the E-RAB RELEASE INDICATION message may be determined by reflecting the check results of the eNB 1 with respect to the RRC Context transmitted to the eNB 1 through the E-RAB RELEASE RESPONSE message.

Option 2 will now be Described.

Referring to FIG. 14(b), in order to request releasing one or more E-RABs configured in the eNB 2, the eNB 2(e.g., SeNB) transmits an E-RAB RELEASE REQUEST message to the eNB 1(e.g., MeNB) (S1407).

The eNB 2 may transmit E-RAB RELEASE REQUEST message based on load states of the macro cell and the small cell. For example, when a load of the macro cell is reduced or when a load of the small cell is increased, the eNB 2 may request releasing E-RABs off-loaded to the small cell.

Here, the E-RAB RELEASE REQUEST message is the same as that of Table 6 described above, so a detailed description thereof will be omitted. However, information included in the RRC Context IE may be different, which will now be described in detail.

The RRC Context IE includes information about RRC configuration values decided for the UE connection in the small cell side.

Further, the RRC Context IE can include the RRC Handover Preparation Information message. For example, the RRC Context IE can includes one or more of information of local E-UTRAN context required by the target eNB, information of UE specific RRM information, information of the RRC protocol release applicable for the current UE configuration, or information of UE-supported E-UTRA Absolute Radio Frequency Channel Number (EARFCN) of the handover target E-UTRA cell, etc.

In response to the E-RAB RELEASE REQUEST message, the eNB 1 (e.g., MeNB) transmits an E-RAB RELEASE RESPONSE message to the eNB 2(e.g., SeNB) (S1409).

The eNB 1 may transmit the modified RRC configuration information to the eNB 2 through the E-RAB RELEASE RESPONSE message.

First, in case of option 2a, the E-RAB RELEASE RESPONSE message is the same as that of Table 7 described above, so a detailed description thereof will be omitted. However, information included in the RRC Context IE may be different, which will now be described.

The RRC Context IE includes information about indication whether the received RRC configuration values are available in the MeNB (i.e. eNB 1) point of view.

If the release request is not allowed or partially allowed for some E-RAB by MeNB, the E-RAB RELEASE RESPONSE message can include the RRC Context. The RRC Context IE contain the information about one of 1) current RRC configuration in the macro cell for the UE (before opening (or setting up) the dual connection), 2) future RRC configuration in the macro cell for the UE (after setting up the dual connection), or 3) recommended RRC configuration in the small cell for the UE (after setting up the dual connection).

Further, the RRC Context IE can include the RRC Handover Preparation Information message. For example, the RRC Context IE can includes one or more of information of local E-UTRAN context required by the target eNB, information of UE specific RRM information, information of the RRC protocol release applicable for the current UE configuration, or information of UE-supported E-UTRA Absolute Radio Frequency Channel Number (EARFCN) of the handover target E-UTRA cell, etc.

Meanwhile, in case of option 2b, the E-RAB RELEASE RESPONSE message may be configured as shown in Table 9 below.

TABLE 9

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Macro eNB UE XnAP ID | M | | 9.2.3.3 | | YES | ignore |
| Small Cell eNB UE XnAP ID | M | | 9.2.3.4 | | YES | ignore |
| E-RAB Release List | | 0 ... 1 | | | YES | ignore |
| >E-RAB Release Item IEs | | 1 ... <maxnoofE-RABs> | | | EACH | ignore |
| >>E-RAB ID | M | | 9.2.1.2 | | — | — |
| RRC Context | M | | OCTET STRING | Includes the RRC Handover Preparation Information message as defined in subclause 10.2.2 of TS 36.331 [9] | — | — |
| Criticality Diagnostics | O | | 9.2.1.21 | | YES | ignore |

The fields enumerated in Table 9 are the same as those of Table 1, so a description thereof will now be omitted.

In case of option 2b compared to option 2a described above, a procedure thereof is identical to that of option 2a, except that E-RAB RELEASE RESPONSE does not include an E-RAB Failed to Release List IE. That is, since the E-RAB RELEASE RESPONSE message does not include an E-RAB Failed to Release List IE, eNB 1 accepts the E-RAB release request from the eNB 2, and in this sense, option 2b is different from option 2a.

The eNB 2 (e.g., SeNB) transmits the E-RAB RELEASE INDICATION message including information regarding one or more released E-RABs to the eNB 1 (e.g., MeNB) (S1411).

Upon receiving the E-RAB RELEASE INDICATION message, the eNB 1 performs a releasing procedure on the E-RABs identified in the E-RAB RELEASE INDICATION message in the core network.

The E-RAB RELEASE INDICATION message is the same as that of Table 8, and thus, a detailed description thereof will be omitted. However, information included in the RRC Context IE may be different, which will now be described.

The RRC Context can contain the information about RRC configuration values decided for the UE RRC connection in the small cell side.

Further, the RRC Context IE can include the RRC Handover Preparation Information message. For example, the RRC Context IE can includes one or more of information of local E-UTRAN context required by the target eNB, information of UE specific RRM information, information of the RRC protocol release applicable for the current UE configuration, or information of UE-supported EARFCN of the handover target E-UTRA cell, etc.

If the release request is not allowed or partially allowed for some E-RAB by MeNB, the E-RAB RELEASE RESPONSE message can include the RRC Context. Thus, if the SeNB receive the RRC configuration information through the E-RAB RELEASE RESPONSE message, it refers to this information to decide the RRC configuration values for the small cell without exceeding the UE capability or violating the RRC configuration policy of the MeNB. That is, the process of configuring the RRC configuration between the eNB 1 and the eNB 2 thereafter may be performed in the same manner as the E-RAB RELEASE procedure initiated by the eNB 1 described above with reference to FIG. 14(a).

Macro-to-small-cell Handover Procedure

When UE has dual connections to a macro cell and small cell, if the traffic load of the macro cell becomes higher, the MeNB may try handing over the UE to the small cell (SeNB). In this case, the role of the SeNB for the UE is changed into a normal Pico eNB from the role of dual connectivity supporting.

FIG. 15 is a view illustrating a handover procedure for dual connection of a UE.

A procedure of performing handover from the MeNB to the SeNB may be performed in the same manner as the handover procedure between MeNBs in FIG. 4 as described above (except for HANDOVER REQUEST message), and thus, a detailed description thereof will be omitted.

Referring to the FIG. 15, for this handover case, as the general handover procedure as described in FIG. 4, the data forwarding is needed from the MeNB to the SeNB. The difference from the conventional handover as described in FIG. 4, due to the dual connection, is that forwarding data from the small cell to the macro cell before forwarding data from the MeNB to the SeNB is also required (S1501). It is inefficiency, for the handover, that the off-loaded data to the SeNB for the dual connection is forwarded to the MeNB and transferred back to the small cell.

To resolve this problem, we propose that the MeNB gives the SeNB the information that helps to distinguish the E-RABs that have been off-loaded to the small cell for the UE to be handed over. Thus, the MeNB indicates the SeNB the information that the data forwarding is not needed and/or the current UE is under serving by the second BS which taking the role of dual connectivity by including indication for notifying the SeNB in the HANDOVER REQUEST message.

The 'Small Cell eNB UE XnAP ID' or the 'Macro eNB UE XnAP ID' can be included in the HANDOVER REQUEST message as below table 10.

TABLE 10

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER $(0 \ldots 2^{32}-1)$ | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| >Subscriber Profile ID for RAT/Frequency priority | O | | 9.2.25 | | — | — |
| >Macro eNB UE XnAP ID | O | | eNB UE X2AP ID 9.2.24 | Allocated at the source eNB | — | ignore |
| >Small Cell eNB UE XnAP ID | O | | eNB UE X2AP ID 9.2.24 | Allocated at the source small cell eNB | — | ignore |
| >E-RABs To Be Setup List | | 1 | | | — | — |
| >>E-RABs To Be Setup Item | | 1 . . . <maxnoof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |

TABLE 10-continued

| IE/Group Name | Presence | Range | IE type and reference | Semantics description | Criticality | Assigned Criticality |
|---|---|---|---|---|---|---|
| >RRC Context | M | | OCTET STRING | Includes the RRC Handover Preparation Information message as defined in subclause 10.2.2 of TS 36.331 [9] | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 [4] | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Mobility Information | O | | BIT STRING (SIZE (32)) | Information related to the handover; the source eNB provides it in order to enable later analysis of the conditions that led to a wrong HO. | YES | ignore |

The fields enumerated in Table 10 are the same as those of Table 1 above, and thus, a description thereof will be omitted.

Referring to Table 10, an IE or IE group included in the HANDOVER REQUEST message will now be described in detail.

Message Type IE uniquely identifies the message being sent.

The Old eNB UE X2AP ID uniquely identifies an UE over the X2 interface within an eNB. The Old eNB UE X2AP ID is allocated at the source eNB (e.g., MeNB).

The Cause IE indicates the reason for a particular event for the whole protocol. That is, information regarding a cause of off-loading may be included.

The Target Cell ID represents an identifier of a target cell. As the Target Cell ID, an ECGI, a unique identifier for identifying a cell globally may be used.

The GUMMEI IE indicates the globally unique MME identity.

UE Context Information IE includes information required for association between a logical S1/X2 connection used for transmission and reception of a UE-related message and a UE and required for a UE in an active state. That is, the UE Context Information IE may include MME UE S1AP ID, UE Security Capabilities, AS Security Information, UE Aggregate Maximum Bit Rate, Subscriber Profile ID for RAT/Frequency priority, Macro eNB UE XnAP ID, Small Cell eNB UE XnAP ID, E-RABs To Be Setup List, RRC Context, Handover Restriction List, Location Reporting Information, Management Based MDT Allowed, and Management Based MDT PLMN List IEs.

The MME UE S1AP ID IE uniquely identifies the UE association over the S1 interface within the MME.

The UE Security Capabilities IE defines the supported algorithms for encryption and integrity protection in the UE.

The AS Security Information IE is used to generate the key material to be used for AS security with the UE.

The UE Aggregate Maximum Bit Rate is applicable for all Non-GBR bearers per UE which is defined for the Downlink and the Uplink direction and provided by the MME to the eNB.

The Subscriber Profile ID IE for RAT/Frequency Selection Priority is used to define camp priorities in idle mode and to control inter-RAT/inter-frequency off-loading in Active mode.

The Macro eNB UE XnAP ID and the Small Cell eNB UE XnAP ID uniquely identify an UE over the Xn interface within an eNB. The Macro eNB UE XnAP ID is allocated at the MeNB. And, The Small Cell eNB UE XnAP ID is allocated at the SeNB. Here, the Xn interface is merely illustrative and an X2 interface, an existing interface between eNBs may be used in the same manner. That is, the above Macro eNB UE XnAP ID can be replaced to an MeNB UE X2AP ID, and the above Small Cell eNB UE XnAP ID can be replaced to an SeNB UE X2AP ID.

E-RABs To Be Setup List IE represents a list of E-RABs requested to be prepared by a target cell (e.g., SeNB), and each E-RAB may include E-RABs To Be Setup Item IE.

E-RABs To Be Setup Item IE represents detailed information regarding each E-RAB. E-RABs To Be Setup Item IE may include E-RAB ID, E-RAB Level QoS Parameters, DL Forwarding, and UL GTP Tunnel Endpoint IEs.

The E-RAB ID IE uniquely identifies an E-RAB for a UE. The E-RAB Level QoS Parameters IE defines the QoS to be applied to an E-RAB and includes necessary QoS parameters. The DL Forwarding IE indicates that the E-RAB is proposed for forwarding of downlink packets. The UL GTP Tunnel Endpoint IE indicates to request data forwarding of uplink packets to be performed for that bearer. That is, this IE is SGW endpoint of the S1 transport bearer for delivery of UL PDUs.

The RRC Context IE can include the RRC Handover Preparation Information message. For example, the RRC Context IE can includes one or more of information of radio resource configuration, information of local E-UTRAN context required by the target eNB, information of UE specific RRM information, information of the RRC protocol release applicable for the current UE configuration, or information of UE-supported E-UTRA Absolute Radio Frequency Channel Number (EARFCN) of the handover target E-UTRA cell, etc.

The Handover Restriction List IE defines roaming or access restrictions for subsequent mobility action for which the eNB provides information about the target of the mobility action towards the UE.

The Location Reporting Information IE indicates how the location information should be reported. The Location Reporting Information IE includes the necessary parameters for location reporting.

The Management Based MDT Allowed IE is used by the eNB to allow selection of the UE for management based Minimization of Drive Tests (MDT).

The Management Based MDT PLMN List IE is to provide the list of PLMNs allowed for MDT.

The UE History Information IE contains information about cells that a UE has been served by in active state prior to the target cell.

The Trace Activation IE defines parameters related to trace activation

The SRVCC Operation Possible IE indicates that both the UE and the MME are Single Radio Voice Call Continuity (SRVCC)-capable.

The CSG Membership Status IE indicates the membership status of the UE to a particular CSG.

The Mobility Information IE is information related to the handover. The source eNB provides it in order to enable later analysis of the conditions that led to a wrong HO.

As shown in Table 10 above, since 'Small Cell eNB UE XnAP ID' or 'Macro eNB UE XnAP ID' is included in the HANDOVER REQUEST message, the SeNB may check off-loaded E-RABs. That is, if the MeNB provides the 'Small Cell eNB UE XnAP ID' or the 'Macro eNB UE XnAP ID' to the SeNB in the handover procedure, the SeNB can recognize the E-RABs to be forwarded back to it among the E-RABs that it serves for dual connections of many UEs and avoid forwarding the E-RAB data to the MeNB. The SeNB just saves the E-RAB data and re-orders them after completing the handover procedure.

However, application of the present invention is not limited thereto (i.e., 'Small Cell eNB UE XnAP ID' or the 'Macro eNB UE XnAP ID') and the present invention may be applied in the same manner even when other explicit information element (IE) is newly defined as indication that the data forwarding is not needed and/or the current UE is under serving by the SeNB which taking the role of dual connectivity.

Thus, the procedure of delivering, by the SeNB, the E-RAB data provided to the UE having dual connection to the MeNB in step S1501 in FIG. 15 is omitted. Also, an effect of delivering, by the MeNB, only the E-RAB data provided to the UE having dual connection to the SeNB in the same manner as that of the existing handover procedure may be obtained.

Apparatus for Implementing the Present Invention

FIG. 16 is a block diagram of a wireless communication apparatus according to an embodiment of the present invention.

Referring to FIG. 16, a wireless communication system includes an eNB 1610 and a plurality of UEs 1620 belonging to the eNB 1610. The eNB 1610 include both the aforementioned MeNB and SeNB.

The eNB 1610 includes a processor 1611, a memory 1612, a radio frequency (RF) unit 1613. The processor 1611 may be configured to implement the functions, procedures and/or methods proposed by the present invention as described in FIG. 1-15. Layers of a wireless interface protocol may be implemented by the processor 1611. The memory 1612 is connected to the processor 1611 and stores various types of information for operating the processor 1611. The RF unit 1613 is connected to the processor 1611, transmits and/or receives an RF signal.

The UE 1620 includes a processor 1621, a memory 1622, and an RF unit 1623. The processor 1621 may be configured to implement the functions, procedures and/or methods proposed by the present invention as described in FIG. 1-15. Layers of a wireless interface protocol may be implemented by the processor 1621. The memory 1622 is connected to the processor 1621 and stores information related to operations of the processor 1622. The RF unit 1623 is connected to the processor 1621, transmits and/or receives an RF signal.

The memories 1612 and 1622 may be located inside or outside the processors 1611 and 1621 and may be connected to the processors 1611 and 1621 through various well-known means. The eNB 1610 and/or UE 1620 may include a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

So far, the example of applying the scheme of determining the Radio Resource Control configuration to the 3GPP LTE/LTE-A system in the wireless communication system supporting dual connectivity in the present invention has been described, but the present invention may be applied to various other wireless communication systems, as well as to the 3GPP LTE/LTE-A system.

The invention claimed is:

1. A method for determining, a radio resource control (RRC) configuration in a wireless communication system supporting dual connectivity, the method comprising:
    transmitting a first message to a secondary eNB (SeNB), the first message including a first RRC configuration of a serving cell of the MeNB; and
    receiving a second message in response to the first message from the SeNB, the second message including a second RRC configuration of a serving cell of the SeNB,
    wherein the MeNB and the SeNB are involved in dual connectivity for a user equipment (UE), and the SeNB determines the second RRC configuration based on the first RRC configuration and a UE capability of the UE.

2. The method of claim 1, further comprising transmitting RRC Connection Reconfiguration message to the UE when the MeNB endorses the second RRC configuration.

3. The method of claim 1, the first message further includes an identifier allocated at the MeNB to identify the UE and a bearer context of the bearer requested to be added.

4. The method of claim 3, the second message further includes an identifier allocated at the MeNB to identify the UE, an identifier allocated at the SeNB to identify the UE and a bearer context of a bearer admitted to be added.

5. The method of claim 1, the first message further includes an identifier allocated at the MeNB to identify the UE, an identifier allocated at the SeNB to identify the UE and a bearer context of the bearer requested to be modified.

6. The method of claim 5, the second message further includes an identifier allocated at the MeNB to identify the UE, an identifier allocated at the SeNB to identify the UE, a bearer context of a bearer admitted to be modified.

7. The method according to claim 1, wherein the second RRC configuration is determined such that a combination of the first RRC configuration and the second RRC configuration do not to exceed the UE capability.

8. A method for determining, a radio resource control (RRC) configuration in a wireless communication system supporting dual connectivity, the method comprising:
    receiving a first message from a master eNB (MeNB), the first message including a first RRC configuration of a serving cell of the MeNB; and
    transmitting a second message in response to the first message to the MeNB, the second message including a second RRC configuration of a serving cell of the SeNB,
    wherein the MeNB and the SeNB are involved in dual connectivity for a user equipment (UE), and the SeNB determines the second RRC configuration based on the first RRC configuration and a UE capability of the UE.

* * * * *